United States Patent [19]

Lee

[11] 4,283,708

[45] Aug. 11, 1981

[54] PAPER CURRENCY ACCEPTOR

[75] Inventor: Larry F. Lee, Grand Rapids, Mich.

[73] Assignee: Rowe International, Inc., Whippany, N.J.

[21] Appl. No.: 48,044

[22] Filed: Jun. 13, 1979

[51] Int. Cl.[3] .......... G06K 9/00; B07C 5/00

[52] U.S. Cl. .......... 340/146.3 Z; 194/4 R; 209/534; 235/449; 340/146.3 C

[58] Field of Search .......... 194/4 R, 4 E; 209/534, 209/567, 569; 235/455, 463, 449; 340/146.3 Q, 146.3 AQ, 146.3 R, 146.3 Z, 146.3 C, 149 R, 149 A

[56] References Cited

U.S. PATENT DOCUMENTS

| | | | |
|---|---|---|---|
| 3,256,984 | 6/1966 | Ptacek | 209/534 |
| 3,485,358 | 12/1969 | Hooker | 209/534 |
| 3,509,535 | 4/1970 | Berube | 209/534 |
| 3,890, 597 | 6/1975 | Hanchett | 235/463 |
| 3,937,926 | 2/1976 | Jones et al. | 235/463 |
| 3,966,047 | 6/1976 | Steiner | 209/534 |
| 3,976,199 | 8/1976 | Schachter | 209/534 |

*Primary Examiner*—Leo H. Boudreau
*Attorney, Agent, or Firm*—Shenier & O'Connor

[57] ABSTRACT

Apparatus for accepting a U.S. bill or other paper currency having a portrait area printed with magnetic ink with spaced parallel lines in the background portions thereof. A pair of zones of predetermined length normally containing said portions and disposed a predetermined distance from an edge of the bill are first magnetized and then moved past a magnetic head to produce a train of pulses spaced by time intervals corresponding to the distance between the lines. For each scanning zone the number of such time intervals falling within a predetermined range is counted, and the bill is rejected unless the number of such time intervals counted is at least a predetermined minimum. In another aspect of the disclosure, an area of the bill normally containing nonmagnetic ink is scanned by a sensor that generates a pulse edge on traversing a magnetic bill portion, and the bill is rejected if a predetermined number of pulse edges are generated during the scanning of such area.

18 Claims, 26 Drawing Figures

FIG. E

FIG. 7
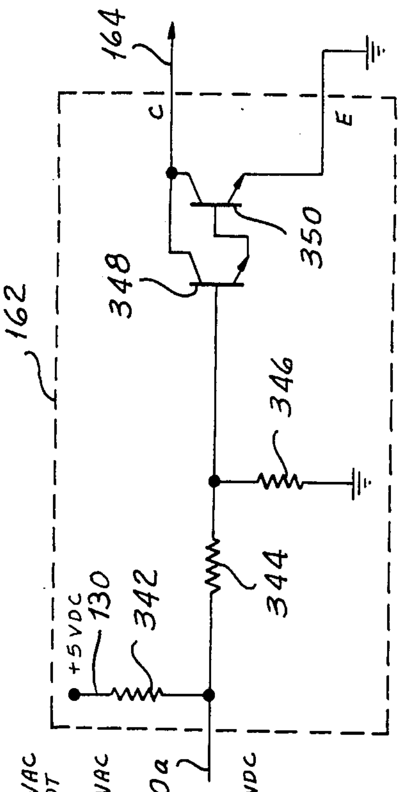
FIG. 8
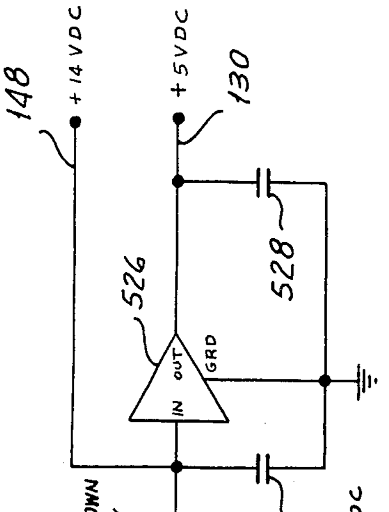
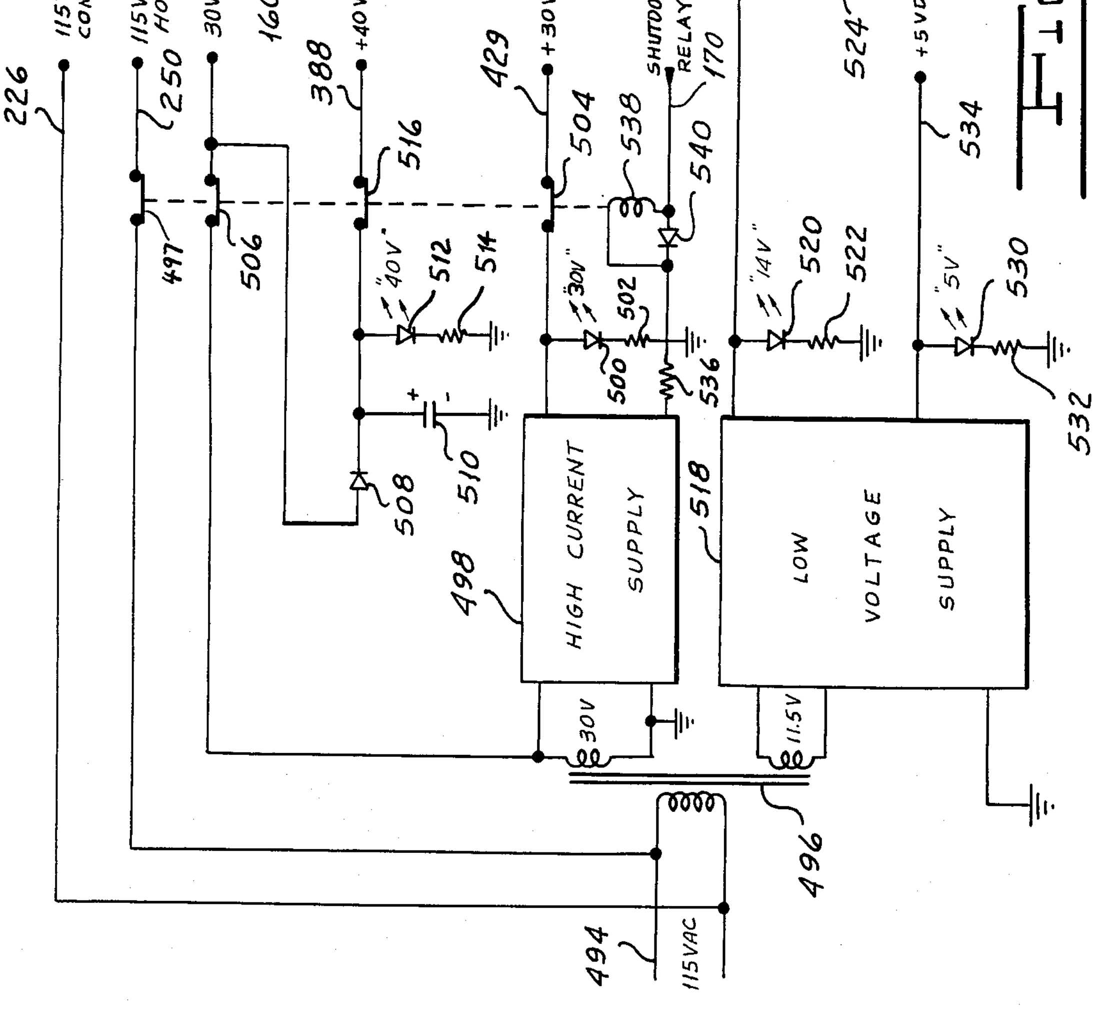

7
P6=1?
YES
NO
806
DELAY
5 ms
808

810
P6=1?
NO
YES
812
STORE
REJECT CODE
5 (0101)
814
JUMP TO
ROUTINE
"REJECT"
816
P1=1?
YES
NO
818
DELAY
5 ms
820
P1=1?
NO
YES
TIMER
=0?
NO
8
826
YES
822
STORE
REJECT CODE
11 (1011)
798
P4=1?
NO
796
YES
DELAY
5 ms
JUMP TO
ROUTINE
"REJECT"
824
800
P4=1?
YES
NO
STORE
REJECT CODE
6 (0110)
802
9
JUMP TO
ROUTINE
"REJECT"
804

PAPER CURRENCY ACCEPTOR

BACKGROUND OF THE INVENTION

This invention relates to apparatus for determining the genuineness of paper currency and, in particular, to apparatus for determining the genuineness of United States one-dollar bills.

Devices that perform one or more tests on U.S. one-dollar bills or other paper currency to determine their genuineness prior to registering credit in a change-making or in a dispensing operation are well known in the art. Typically in such devices, the paper currency being validated is moved along a path along which various optical, magnetic or edge-sensing tests are performed on the bill. On failing any of these tests, the bill is returned to the user, and no credit is given.

Many of these devices exploit the fact that certain areas of genuine U.S. bills are printed with ink containing magnetizable material, while certain other areas are printed with ordinary nonmagnetic ink. Thus, in the apparatus disclosed in U.S. Pat. No. 3,485,358, issued to D. E. Hooker, the portrait area of a one-dollar bill is first magnetized and then moved past a magnetic head which senses the parallel vertical lines in the background portion of the portrait. The signal from the head is fed to a tuned amplifier, the output of which reaches a certain critical magnitude if the lines on the bill being tested are actually printed with magnetic ink and are spaced from one another by the proper distance. Failure of the amplifier output to reach the critical magnitude causes the bill to be rejected.

In another such apparatus, described in U.S. Pat. No. 3,966,047, issued to L. E. Steiner, the magnetic head is also used to scan a portion of the bill, such as the portions containing the Federal Reserve seal or serial number, printed with nonmagnetic ink. If a magnetic signal is detected at this point, as would happen if the inserted bill were a photocopy made with magnetic toner, the bill is rejected as being a counterfeit.

Devices such as described in the above-identified patents are subject to several types of error. In the device shown in the Hooker patent, the magnetic signal is linearly amplified by a tuned amplifier and then fed to a detector to provide an envelope signal which is sampled at the proper time. The amplitude of the sampled envelope signal thus depends not only on the spacing and magnetic content of the lines being scanned, but also on such extraneous factors as the gain of the amplifier, the amount of dirt that has accumulated on the magnetic head, and the degree to which the magnetic ink has been worn off the bill from normal handling. Slight deviations in the resonant frequency of the LC tuning circuit will also effect the amplitude of the envelope signal, particularly where a high-Q circuit is employed.

All of these extraneous factors taken together result in a region of uncertainty in which the level of the envelope is not necessarily indicative of either a genuine or a counterfeit bill. If the threshold envelope level for acceptance is simply set high enough to ensure against false acceptances of counterfeit bills, there will also necessarily be many false rejections of genuine bills, resulting in customer dissatisfaction as well as decreased revenue.

SUMMARY OF THE INVENTION

One of the objects of my invention is to provide a paper currency acceptor which reliably rejects counterfeit paper currency.

Another object of my invention is to provide a paper currency acceptor which reliably accepts genuine paper currency.

Still another object of my invention is to provide a paper currency acceptor which reliably accepts bills which have become worn through normal handling.

A further object of my invention is to provide a paper currency acceptor which continues to operate reliably when its magnetic sensing head has accumulated a deposit of dirt and grease.

Other and further objects will be apparent from the following description.

In general, my invention contemplates apparatus for validating a U.S. bill or other paper currency printed with spaced parallel lines in which the lines are scanned, with a magnetic head if the lines are printed with magnetic ink, to produce a train of output pulses spaced by time intervals corresponding to the distances between respective pairs of lines. The number of time intervals falling within a predetermined range indicative of a genuine bill is counted, and the bill is indicated as being acceptable only if at least a predetermined number of time intervals fall within the range.

Since my apparatus measures the time interval between successive pulses rather than the output of a tuned amplifier or other linear circuit, it is highly insensitive to such spurious sources of signal variability as deviations in amplifier gain or resonant frequency, accumulation of dirt on the magnetic head, and worn bills. Further, by using a crystal oscillator as a frequency standard, I can provide an apparatus the performance of which is virtually immune to variations in circuit parameters of resistance, inductance and capacitance.

In another aspect, my invention contemplates apparatus for validating a U.S. bill, or other paper currency normally containing magnetic ink in certain areas and containing nonmagnetic ink in certain other areas, in which one of the areas normally containing nonmagnetic ink is scanned by a sensor that generates a pulse edge on traversing a magnetic bill portion. The bill is indicated as being unacceptable if a predetermined number of pulse edges are generated during the scanning of the normally nonmagnetic area.

BRIEF DESCRIPTION OF THE DRAWINGS

In the accompanying drawings to which reference is made in the instant specification and in which like reference characters are used to indicate like parts in the various views:

FIG. 3 is a schematic diagram of an additional portion of the output assembly of the control circuit shown in FIGS. 2*a* to 2*c*.

FIG. 7 is a schematic diagram of a driver circuit shown in block form in FIG. 2c.

FIG. 8 is a schematic diagram of the power supply of the control circuit shown in FIGS. 2a to 2c.

DESCRIPTION OF THE PREFERRED EMBODIMENT

Figure 1:
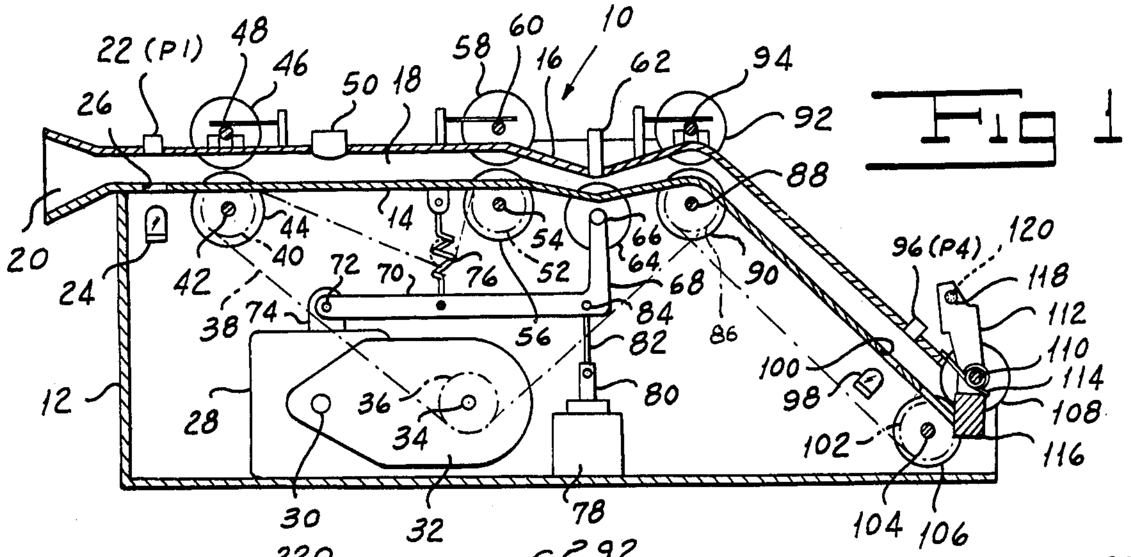
FIG. 1 is a section of the bill transport assembly of a bill and coin changer incorporating my invention.

Referring now to FIG. 1 of the drawings, a bill and coin changer incorporating my paper currency acceptor includes a bill transport assembly, indicated generally by the reference character 10. Assembly 10 includes a housing 12 carrying spaced lower and upper guides 14 and 16 forming a passage 18 into which a bill is introduced through a mouth 20 at the left end of the passage as viewed in the figure. A photocell 22 mounted in the upper guide 16 normally is illuminated by means of a lamp 24 casting light through an opening 26 in the lower guide 14. As will be more fully explained hereinbelow, as a bill is introduced into the passage 18 through the mouth 20 it interrupts the light from lamp 24 falling on photocell 22 to energize a drive motor 28 to drive in a forward direction to rotate a shaft 30 providing the input to a gear box 32. Motor 28 is preferably a synchronous motor but may be a low-slip induction motor so that the speed of the bill is accurately regulated at approximately 7.88 inches per second. The gear box 32 has an output shaft 34 carrying a sprocket wheel 36 which drives a pitch chain 38.

Chain 38 extends to a sprocket wheel 40 carried by a shaft 42 supported on the housing 12. Shaft 42 carries a number of spaced transport wheels 44 adapted to cooperate with upper idler wheels 46 carried by a shaft 48. As the bill enters into the nip between the wheels 44 and 46 it is carried along the passage 18 from left to right as viewed in FIG. 1. For proper operation of the acceptor the bill must be inserted face up with the portrait facing in the direction of movement of the bill. In the course of its movement along the passage 18 the bill passes under an anti-cheat magnet 50 supported in the upper guide.

Chain 38 extends around a sprocket wheel 52 carried by a shaft 54 supporting a number of spaced lower intermediate transport wheels 56. Wheels 56 cooperate with upper idler wheels 58 carried by a shaft 60 to continue the movement of the bill along the passage 18. As the bill moves along the passage past the wheels 56 and 58, areas thereof are scanned by a magnetic pickup head 62. The magnetic head 62 scans along a band which is centered at about 15/16 inch from the bottom of the bill and which passes through the neck of the portrait.

It will readily be appreciated that the head 62 is made sufficiently wide so that correct predetermined regions of the bill are scanned. In my bill acceptor I ensure that the head sequentially scans the neck region and then the serial number and Federal Reserve seal region of the bill. A pressure roller 64 disposed below the head 62 is carried by a shaft 66 which is supported on one arm 68 of a bell crank having a second arm 70, the end of which is supported on a pivot pin 72 carried by a bracket 74 on the housing of motor 28. A spring 76 connected between the arm 70 and the lower guide 14 normally biases the lever arm to urge the pressure roller 64 upwardly into the passage 18 so as to press a bill firmly into engagement with the sensing head 62. A solenoid 78 has an armature 80 connected by a rod 82 to a pivot pin 84 on the lever arm 70. Solenoid 78 is adapted to be energized in a manner to be described hereinbelow to move the pressure roller 64 away from the head 62.

Chain 38 extends around a sprocket wheel 86 carried by a shaft 88 supported on the housing 12. Shaft 88 carries a plurality of spaced lower transport rollers 90 which cooperate with upper idler rollers or wheels 92 carried by a shaft 94. As the bill leaves the wheels 90 and 92 it moves along a portion of the passage 18 extending downwardly and to the right as viewed in FIG. 1. A photocell 96 mounted in the upper guide 16 normally is illuminated by a lamp 98 which throws light through an opening 100 in the lower guide 14. As the leading edge of the bill arrives at the opening 100 it interrupts the light from lamp 98 to photocell 96.

Chain 38 also is coupled to a sprocket wheel 102 carried by a shaft 104 supported on housing 12 at the lower right-hand end of guide 14. Shaft 104 carries a plurality of spaced transport wheels 106 which cooperate with idler wheels 108 carried by a shaft 110 at the lower right-hand end of the upper guide 16.

Shaft 110 carries a lever arm 112 the lower end of which is disposed in the path of bills emerging from the nip between wheels 106 and 108. A spring 114 on shaft 110 is biased between the lower edge of the upper guide 16 and a boss 116 on the lever 112 normally to position the lower end of the lever in the path of the emerging bill. The upper end of the lever 112 normally is positioned in the space between a photocell 118 and a lamp 120. As the bill emerges from the nip between rollers 106 and 108 it activates the arm 112 to move the upper end thereof against the action of spring 114 out of the space between photocell 118 and lamp 120 so that light from the lamp is permitted to fall onto the photocell.

Figure 2A:
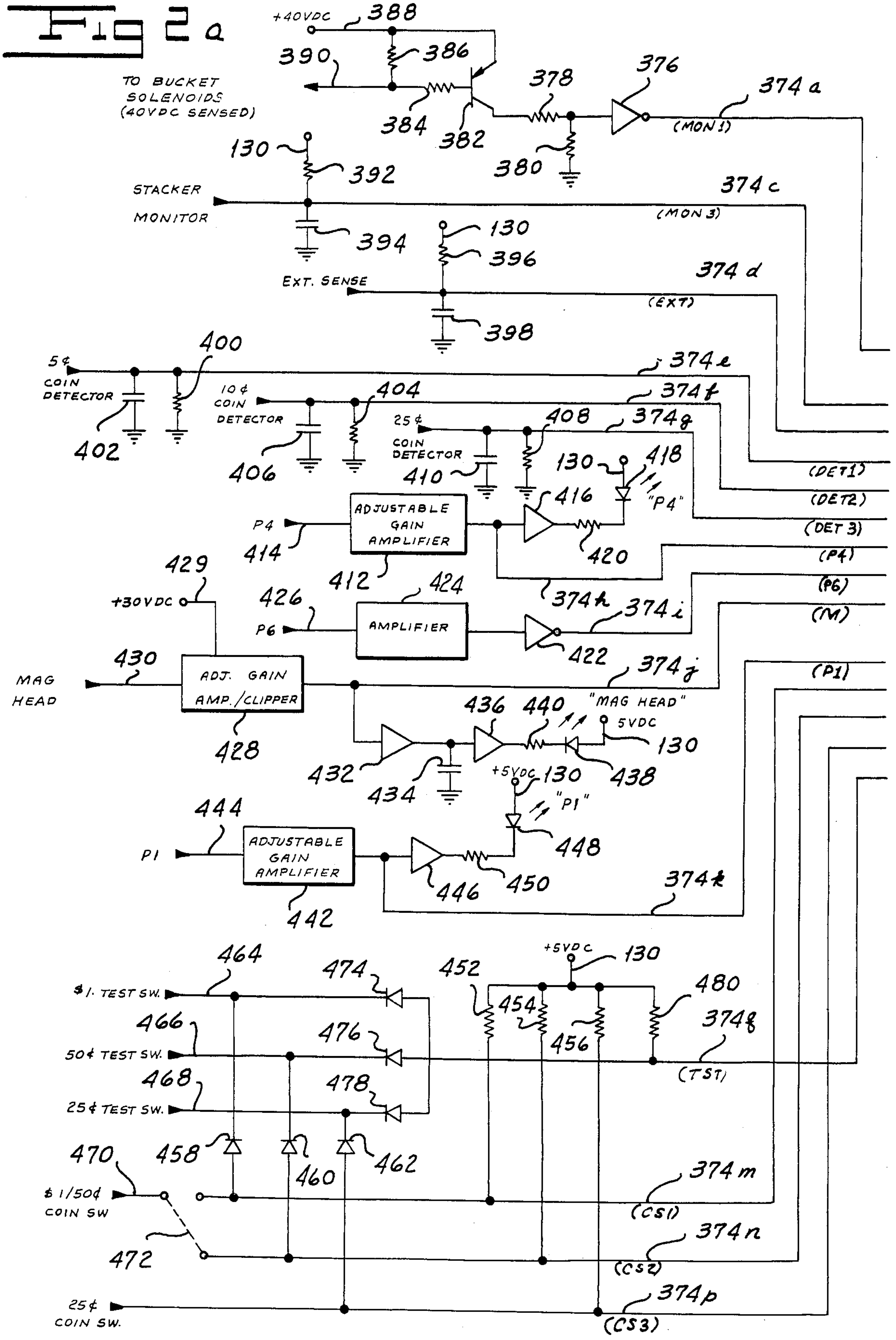
FIGS. 2*a* and 2*c* are portions of a schematic diagram of the control circuit associated with my bill and coin changer.
Figure 2B:
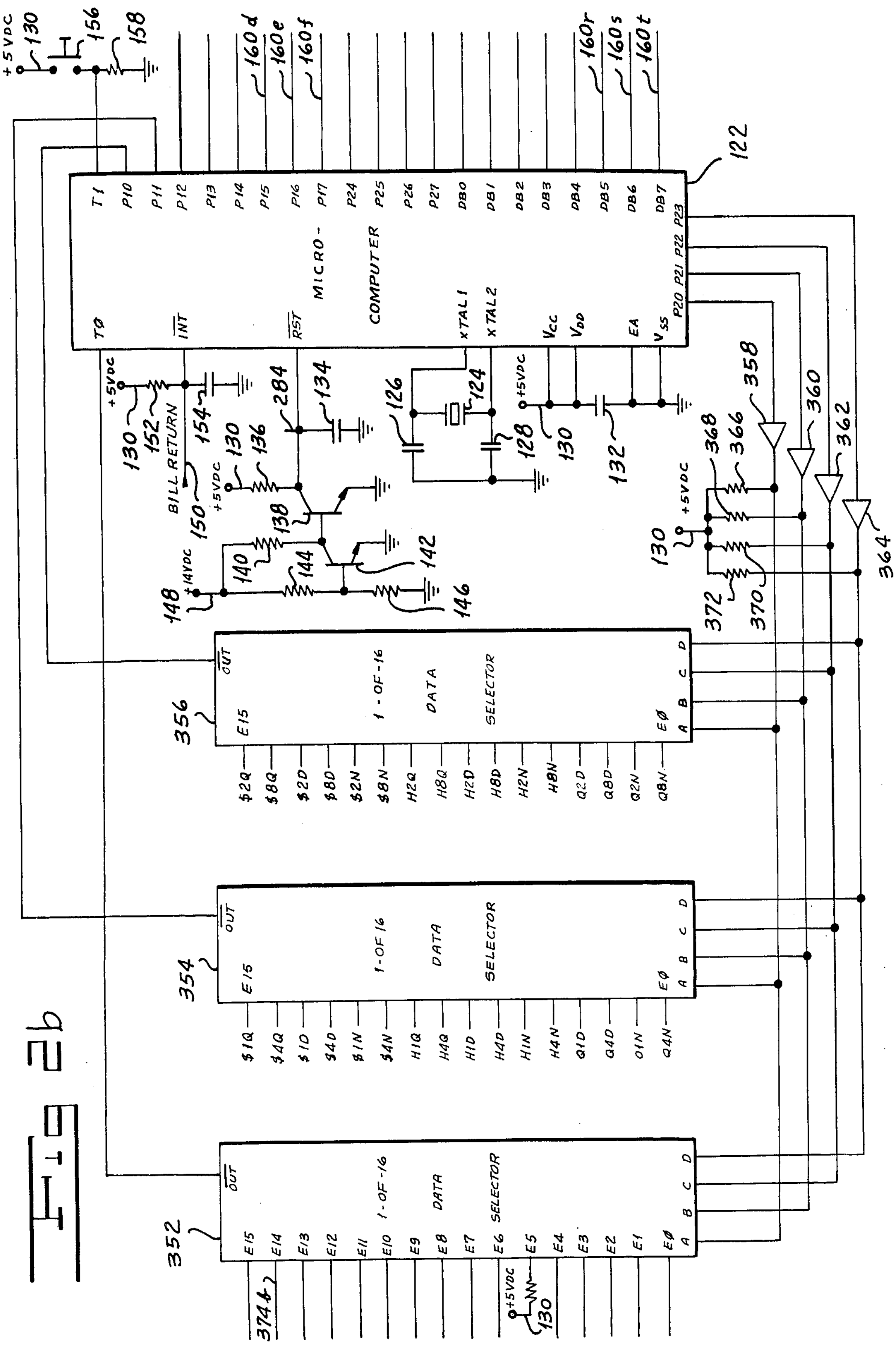
Figure 2C:
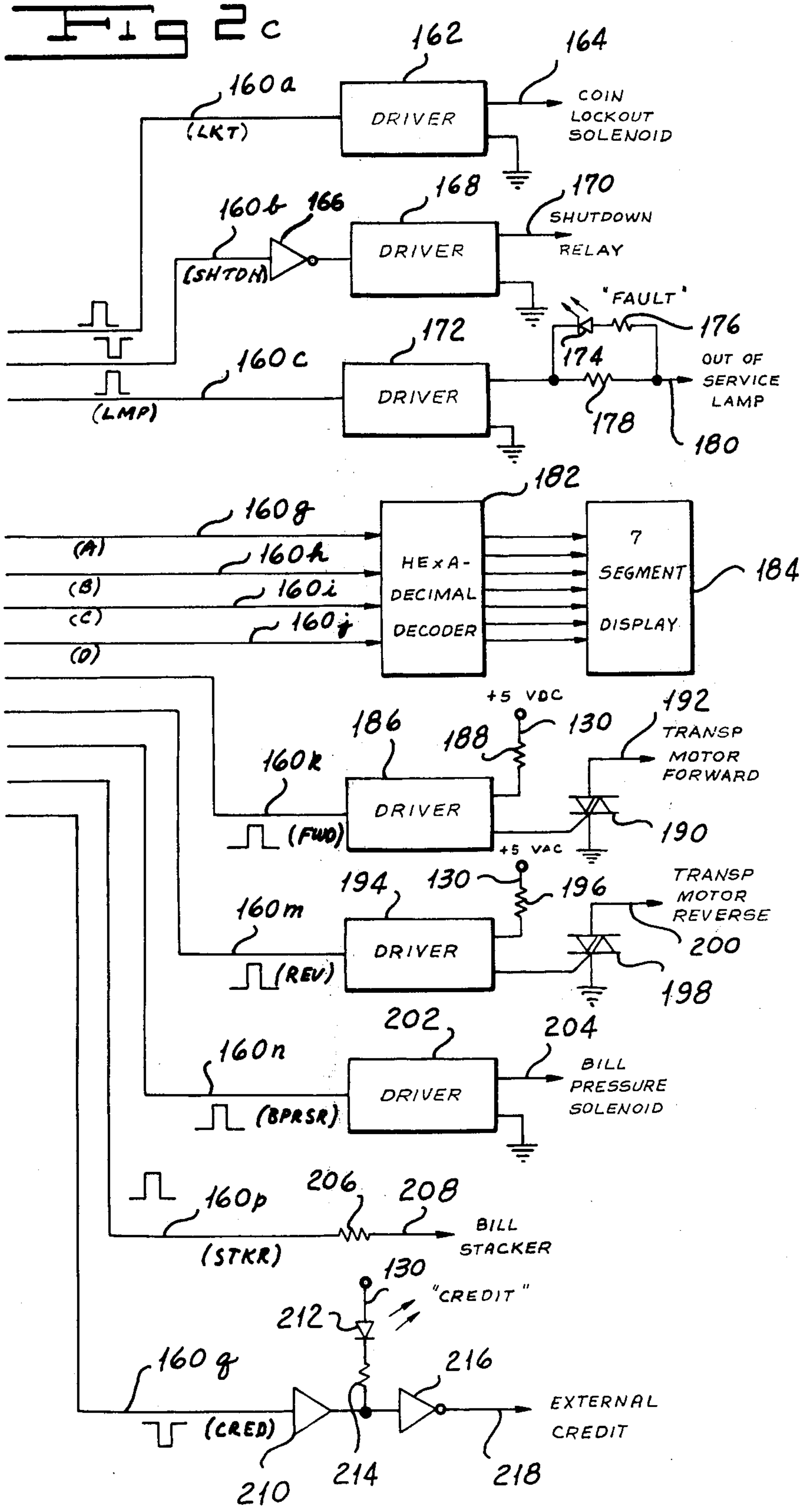

Referring now to FIGS. 2a to 2c, the control system of my bill and coin changer includes a microcomputer 122 such as the 8048 microcomputer available from Intel Corporation of Santa Clara, California 95051. The operation and pin configuration of microcomputer 122 are described in detail in the Intel user's manual entitled *MCS*-48 *Family of Single Chip Microcomputers* (1978). Although a microcomputer having an integral data and program memory is used in the system described, it will be apparent to those skilled in the art that my control system can also be implemented using a microprocessor and external program and data memories. To provide a suitable timing source for the microcomputer 122, I couple a crystal 124 having a resonant frequency of approximately 3.58 MHz across the crystal oscillator inputs XTAL1 and XTAL2 of the microcomputer. Respective capacitors 126 and 128 provide paths between the crystal oscillator inputs and ground. I couple the main power supply pin $V_{cc}$ and the programming power supply pin $V_{dd}$ to a line 130 providing a 5 volt DC potential, while I couple the external access input $\overline{EA}$ and the ground pin $V_{ss}$ to ground. I connect a bypass capacitor 132 between the power supply inputs and ground.

I so couple the reset pin $\overline{RST}$ of the microcomputer 122 that loss of voltage either on the 5 volt line 130 or a 14 volt line 148 will cause the microcomputer 122 to reset itself. More particularly, I connect the 14 volt line 148 to the base of an NPN transistor 142 through a voltage divider circuit comprising resistors 144 and 146 and to the collector of transistor 142 through a load resistor 140. The emitter of transistor 142 is grounded, while the collector drives the base of a second NPN transistor 138. I couple the collector of transistor 138 to the 5 volt line 130 through a load resistor 136 and to the reset input RST of microcomputer 122 directly. A bypass capacitor 134 connects the reset input to ground. Normally, the transistor 142 is saturated while transistor 138 is cut off. If, however, because of a lower power line voltage the potential on line 148 should drop below a certain value, transistor 142 will begin to cut off, causing the collector potential to rise to a high value and render transistor 138 conductive. As a result, the collector potential of transistor 138 drops to a low level to cause the microcomputer 122 to reset. Similarly, a loss of voltage on 5 volt line 130 will directly result in a loss of voltage at the reset pin, with the same effect.

To allow the bill and coin changer to be placed in a bill-returning mode, I couple the interrupt pin $\overline{INT}$ of the microcomputer 122 to a "bill return" line 150 which is grounded when the coin return button (not shown) of the changer is depressed. A pull-up resistor 152 and a bypass capacitor 154 connect line 150 respectively to the 5 volt DC line 130 to maintain line 150 normally at a high potential, and to ground. I also provide an external reset by inserting a normally open push-button switch 156 between a test input pin T1 and the 5 volt line 130. A resistor 158 normally maintains the pin T1 at ground potential. Switch 156 is actuated by the serviceman to restore the bill and coin changer after a fault has been diagnosed and corrected.

Microcomputer 122 has an 8-bit bi-directional port or data bus comprising pins DB0-DB7, an 8-bit quasi-bi-directional port comprising pins P10–P17, and a second 8-bit quasi-bi-directional port comprising pins P20–P27. Of these pins, I couple pins P12–P27, and DB0-DB7 to respective output lines **160*a*–160*t* controlling the various output devices of my bill and coin changer. (The letters "1" and "0" are not used here to avoid confusion with the similar-appearing numerals). As will appear below, lines 160*a*–160*t* are also given mnemonic designations, indicative of their functions, to facilitate understanding of the flowcharts shown in FIGS. 9*a* to 12**.

Line **160*a* provides an input to a driver circuit 162, the internal configuration of which I show in FIG. 7. Referring now to FIG. 7, line 160*a* (LKT) is coupled to one end of a resistor 344, the other end of which leads to the base of the first of a pair of Darlington-coupled NPN transistors 348 and 350. A resistor 342 connects the 5 volt line 130 to the input end of resistor 344 to provide a bias potential to the transistors 348 and 350, while a second transistor 346 provides a path between the base of transistor 348 and ground. The collector and emitter of output transistor 350 constitute the outputs of driver 162 and will close an external circuit whenever a positive potential is applied to line 160*a*. Circuit 162 acts as a switch permitting current flow between the collector and emitter of transistor 350 whenever a high-level potential appears on line 130. I connect the emitter and collector of transistor 350 respectively to ground and to a "coin lockout solenoid" line 164. Line 164** controls a solenoid (not shown) which is energized to allow coins to be deposited at certain points in the sequence of operation of the changer.

I couple line **160*b* (SHTDN) through an inverter 166 to another driver 168 identical to the driver 162. Driver 168 has its emitter output grounded while its collector output is applied to a "shutdown relay" line 170. Line 170** controls a relay in the power supply to be described which shuts off power when necessary to prevent damage to components or uncontrolled dispensing of change ("jackpotting").

Line **160*c* (LMP) is coupled to the input of a driver 172 also identical to the driver 162. Driver 172 has its emitter output grounded while the collector output feeds "out-of-service lamp" line 180 through a resistor 178. Line 180 controls a lamp (not shown) to indicate that the bill and coin changer is out of service. A light-emitting "fault" (LED) diode 174 coupled in series with a resistor 176 across resistor 178** provides an additional indication to the serviceman that the changer is out of service.

Lines **160*g*–160*j* (A–D) provide bit inputs to a hexadecimal decoder and driver circuit 182, the output of which drives a seven-segment digital display 184. Display 184 displays any one of 15 characters 1–9** or A–F (zero inputs being blanked) indicating either a particular fault in the bill and coin changer circuit or a particular condition prompting rejection of a dollar bill.

Line 160K (FWD) feeds a driver 186 similar to driver 162. I couple the collector and emitter of driver 186 respectively to the 5 volt supply line 130 through a resistor 188, and to the gate of a gate-controlled semiconductor switch or triac 190. Switch 190 is connected between ground and a "transport motor forward" line 192 which when energized drives transport motor 28 in a forward direction.

I couple line **160*m* (REV) to the input of a driver 194 similar to driver 162. A resistor 196 connects the collector of driver 194 to line 130. I connect the emitter of driver 194 to the gate of a triac 198. Switch 198 when energized couples ground to a "transport motor reverse" line 200 to drive transport motor 28 in a reverse direction. In a similar manner, line 160*n* (BPRSR) feeds the input of a driver 202, the emitter output of which is grounded and the collector output of which appears on a "bill pressure solenoid" line 204. Line 204 actuates solenoid 78** when energized.

Line **160*p* (STKR) drives a "bill stacker" line 208 through a resistor 206. Line 208 controls the mechanism (not shown) which stacks the bills from the bill acceptor 10 after they have cleared lever arm 112. One form of bill stacking mechanism which can be used is shown in U.S. Pat. No. 3,917,260, issued Nov. 4, 1975, to Okkonen and Herring. Line 160*q* (CRED) feeds a driver 210, the output of which drives an "external credit" line 218 through an inverter 216. External credit line 218 provides a signal to an optional external apparatus such as a vending machine indicating that sufficient credit has been established and that the machine may dispense the selected article. I connect a "credit" LED 212 and a resistor 214 in series between line 130 and the output of driver 210**.

Referring now to FIG. 3, output lines **160*d*–160*f* (HOP1–HOP3) drive respective electronic relay circuits indicated generally by the reference numerals 220, 222 and 224. In response to positive or high signals on their input lines, relays 220–224 couple a "115 volt common" line 226 respectively to "5¢ hopper motor" line 228, "10¢ hopper motor" line 230** and 25¢ hopper motor" line 232. Lines 228–232 energize the motors (not shown) associated with the respective coin hoppers of the coin dispenser (not shown) in a manner to be further described. A three-input NOR gate 234 responsive to lines 160*d*–160*f* feeds a driver 236, the output of which is coupled through a resistor 240 to a "hopper" LED 238, one terminal of which is coupled to 5 volt line 130. "Hopper" LED 238 is lit in response to a high signal on any one of the output lines 160*d*–160*f* to indicate that a hopper motor is energized.

Output lines 228–232 are connected through respective resistors 242, 244 and 246 to one input of a photon-coupled isolator or optical coupler 248, the other input terminal of which leads to a "115 volt hot" line 250. A shunt diode 252 allows bi-directional current flow through resistors 242–246. I connect the collector of isolator 248 to line 130 through a resistor 254. The common emitter and base terminal of coupler 248 leads to the base of an NPN transistor 256. Transistor 256 has its emitter grounded and its collector coupled to line 130 through load resistor 258 and to a "hopper monitor" line (MON2) 374*b*. A capacitor 260 coupled between line 374*b* and ground filters out any undesirable transients. Hopper monitor line 374*b* provides a signal, to be used in a manner to be described, indicating that an AC voltage relative to line 250 actually appears on one of lines 228–232.

Output lines 160*r*–160*t* (BKT1–BKT3) feed the inputs of respective solenoid driver circuits indicated generally by the reference numerals 264, 266 and 268. In response to low output signals on lines 160*r*–160*t*, drivers 264–268 provide respective driving signals on "$1 bucket solenoid" line 270, "50¢ bucket solenoid" line 272, and "25¢ bucket solenoid" line 274. Lines 270–274 energize solenoids (not shown) associated with the coin dispenser which operate in a manner to be described to dump or relase the contents of respective change buckets (not shown) to the user. A NOR gate 276 responsive to the second output of each of solenoid drivers 264–268 feeds a driver 278. Driver 278 in turn is coupled through a resistor 280 to one terminal of a "vend" LED 282, the other terminal of which leads to line 130.

Each of electronic relays 220–224 and solenoid drivers 264–268 receives an inhibit input from a line 292 leading to the emitter of the output transistor 288 of a pair of NPN transistors 286 and 288 arranged in a Darlington configuration with line 130 providing a voltage source and with a resistor 290 between the output and the input line 284 leading to the reset input of microcomputer 122.

Line 284 normally carries a high potential which transistors 286 and 288 apply to line 292. When, however, line 284 drops to a low potential in response to a low supply voltage, transistors 286 and 288 cut off and the potential on line 292 drops to a relatively low value, inhibiting circuits 220–224 and 264–268. These circuits are disabled in response to a low supply voltage to prevent the erroneous dispensing of coins during abnormal operation of the bill and coin changer.

Figure 5:
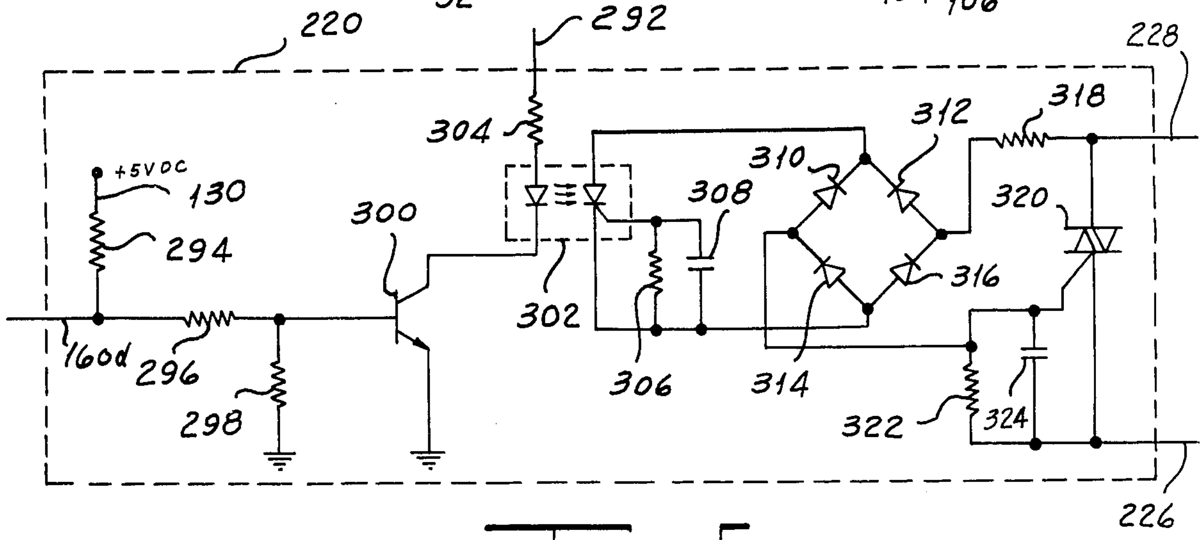
FIG. 5 is a schematic diagram of an electronic relay shown in block form in FIG. 3.

Referring now to FIG. 5, circuit 220, to which circuits 222 and 224 are identical, includes an NPN input transistor 300, having a grounded emitter and a base connected to line 160*d* through resistor 296. A resistor 294 between line 130 and input line 160*d* and another resistor 298 between the transistor base and ground complete the biasing circuit of transistor 300. The collector of transistor 300 leads to one input terminal of a photocoupled isolator 302, the other input of which is provided by inhibit line 292 through resistor 304.

In isolator 302, a diode serves as the photon emitter while a silicon-controlled rectifier (SCR) serves as the photon receptor. Normally, in the absence of current flow through, and hence photon emission from, the diode, the SCR remains nonconductive, preventing current flow through the full-wave rectifier bridge comprising diodes 310, 312, 314 and 316. Under these conditions a triac 320 coupled between lines 226 and 288 is nonconductive. In response to current flow through the photon-emitting diode, the SCR becomes conductive, permitting current flow from line 228 through a resistor 318 and the rectifier bridge to the gate of triac 320, turning it on. Respective resistors 306 and 322 and shunt capacitors 308 and 324 prevent noise from falsely triggering the isolator SCR and triac 320, respectively. Circuit 220 thus provides AC coupling between line 226 and line 228 in response to a high-level signal on line 160*d* whenever line 292 carries a high (5 volt) potential.

Figure 6:
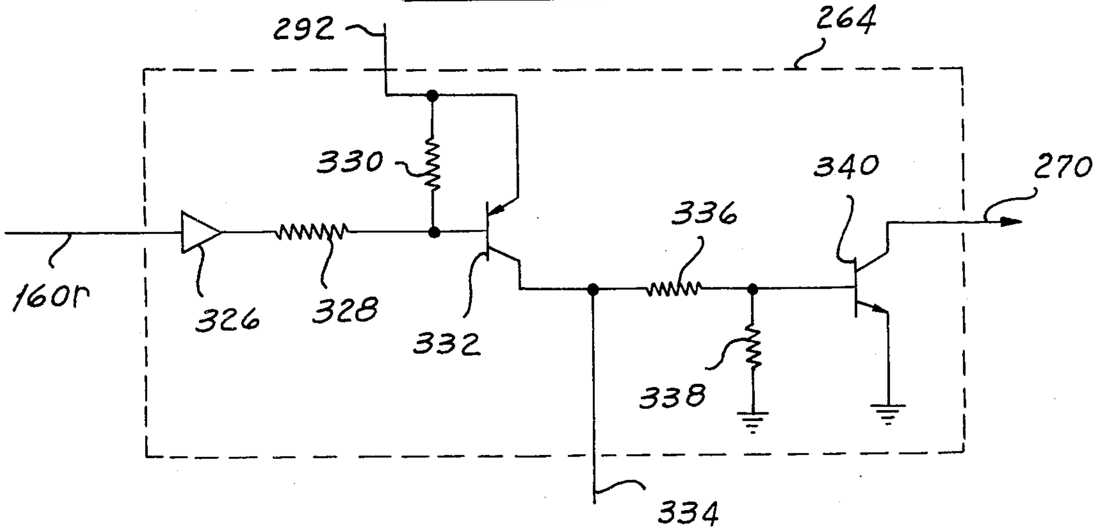
FIG. 6 is a schematic diagram of a solenoid driver shown in block form in FIG. 3.

Referring now to FIG. 6, in driver circuit 264, to which circuits 266 and 268 are identical, a line 160*r* feeds the input of a driver 326, the output of which is connected to the base of a PNP transistor 332 through a resistor 328. A resistor 330 couples the base to the emitter of transistor 332. Transistor 332 has its emitter coupled to inhibit line 292 and its collector coupled to an output line 334 used to drive NOR gate 276. The collector of transistor 332 also drives the base of an NPN transistor 340 through a voltge divider comprising resistors 336 and 338. I ground the emitter of transistor 340 and couple the collector to output line 270.

Circuit 264 operates as a directly coupled DC amplifier whenever a supply voltage is available on line 292, as is normally the case. In response to a low signal on line 160*r*, circuit 264 provides a high output on line 334 while transistor 340 provides a low-resistance path between line 270 and ground. If, however, line 292 should drop to a low potential, transistor 340 will remain cut off regardless of the level of the signal on line 160*r*, thus preventing the bucket solenoids from being erroneously actuated.

To couple the changemaker inputs to microcomputer 122, I respectively connect the T0 pin to the output of a first 1-of-16 data selector 352, such as a 74150, and pins P10 and P11 to the outputs of 1-of 16 data selectors 356 and 354. Circuits 352–356 each have 16 data inputs E0-E15 which may be selectively read by applying an appropriate four-bit binary signal 0000–1111 to address inputs A–D. I pass this four-bit address signal from output pins P20–P23 of microcomputer 122 to the address inputs A–D through respective drivers 358, 360, 362 and 364. Respective pull-up resistors 366, 368, 370 and 372 leading to line 130 normally hold the address inputs at a high logic level.

Referring particularly to FIGS. 2*a* and 2*b*, data selector 352 includes input pins E15-E6 and E4-E0 coupled to a plurality of input lines 374*a* to 374*q*, respectively, in turn connected to the various input devices of the bill and coin changer. Thus, line 347*a* (MON1) is coupled to the output of an inverter 376. A voltage divider made up of resistors 378 and 380 supplied with the output of a transistor 382 provides the input to inverter 376. A 40*v* DC line 388 is the source of emitter voltage for transistor 382. Line 388 also provides the base bias through resistors 386 and 384. Line 390 provides the signal input to transistor 382. Whenever a bucket solenoid draws current in response to being energized through line 270, 272 or 274, the potential difference developed across resistor 386 renders transistor 382 conductive, creating a voltage drop across resistor 380. Inverter 376 provides a low-level signl on line 374*a* to indicate that one of the bucket solenoids is being energized.

As has been described above, line 374*b* (MON2) is coupled to the collector of transistor 256 to provide a low-level signal indicating that one of the hopper motors (not shown) is being energized. Line 374*c* (MON3), which is also coupled to 5 volt line 130 through resistor 392 and shunted by a capacitor 394, carries a low-level signal whenever the bill stacker motor (not shown) is energized. Likewise, line 374*d* (EXT), coupled to 5 volt line 130 through resistor 396 and to ground through capacitor 398, receives a low-level logic signal from an external apparatus such as a vending machine (not shown) to indicate that the apparatus has control and that the coin dispenser should not be actuated.

Input line 374*e* (DET1) provides a low-level signal rom a suitable sensor (not shown) which detects the dispensing of a nickel from its hopper. Resistor 400 and capacitor 402 coupled between line 374*e* and ground provide suitable pulse shaping. Likewise, line 374*f* (DET2) provides a low-level signal from a sensor in response to the dispensing of a dime. Resistor 404 and capacitor 406 perform a shaping function similar to that of elements 400 and 402. Finally, line 374*g* (DET3) provides a low-level signal in response to the dispensing of a quarter. Resistor 408 and capacitor 410 perform the pulse-shaping function previously referred to.

Line 374*h* (P4) is responsive to the output of an adjustable-gain amplifier 412, the input of which is derived from a line 414 coupled to photocell 96. Amplifier 412 also feeds a driver 416, the output of which feeds a "P4" LED 418 through a resistor 420. Similarly, line 374*i* (P6) is responsive to an inverter 422 which in turn is responsive to the output of an amplifier 424. Amplifier 424 has its input coupled to a line 426 connected to photocell 118.

Input line 374*i*(M) is responsive to the output of a combination adjustable-gain amplifier and clipper 428 which receives a 30 volt DC supply voltage from a line 429 and a signal input on a line 430 connected to the magnetic head 62. Since magnetic head 62 responds to changes in magnetic flux density, the signal produced on line 430 in response to the traversing by head 62 of the leading and trailing edges of the lines being scanned will comprise a series of alternating positive and negative pulses. The clipping point of amplifier-clipper 428 is set asymmetrically so that line 374*j* generates a logic level 1 output whenever line 430 is positive by more than a predetermined amount and generates a logic 0 output otherwise, as when line 430 is quiescent or negative. "Positive" and "negative", and "0" and "1", in this context, can of course be interchanged. Line 374*j* thus carries a train of pulses the corresponding edges of which are spaced in accordance with the spacing between the leading or trailing edges of the lines being scanned, depending on the polarity of the clipping point.

Amplifier 428 also feeds a driver 432, the output of which I couple to ground through a capacitor 434 and to the input of another driver 436. A resistor 440 applies the output of driver 436 to one terminal of a "magnetic head" LED 438, the other terminal of which is coupled to a 5 volt line 130.

Line 374*k* (P1) is responsive to the output of an adjustable-gain amplifier 442 receiving an input from a line 444 coupled to photocell 22. Amplifier 442 also feeds a driver 446 the output of which is coupled through a resistor 450 to one terminal of a "P1" LED 448, the other terminal of which I couple to line 130. Diodes 418, 438 and 448 permit ready monitoring by the serviceman of whether the gains of amplifiers 412, 428 and 442 are adjusted to proper levels.

In the coin changer with which my improved bill acceptor is used provision is made for alternately accepting either 50-cent pieces or dollar coins. A line 470 provides a low-level pulse in response to the deposit of either a 50-cent piece or a dollar coin, whichever coin the changer is designed to accept. A jumper cable 472 may be arranged to couple this line either to input line 374*m* (CS1) to indicate a deposit of a dollar coin or to line 374*n* (CS2) to indicate the deposit of a 50-cent piece. Line 374*p* (CS3) provides a low-level pulse in response to the deposit of a quarter. Respective pull-up resistors 452, 454 and 456, one terminal of each of which I couple to line 130, normally hold lines 374*m*–374*p* at a high logic level. Respective isolating diodes 458, 460 and 462 connect lines 374*m*–374*p* to respective "$1 test switch" line 464, "50-cent test switch" line 466 and "25-cent test switch" line 468, which receive low-level pulses whenever the serviceman wishes to simulate the deposit of a particular coin. Respective diodes 474, 476 and 478 couple lines 464–468 to input line 374(*q* (TST) to provide a signal on that line indicating that one of the test switches has been actuated. Pull-up resistor 480, one terminal of which leads to line 130, normally holds line 374*q* at a high logic level.

Figure 4:
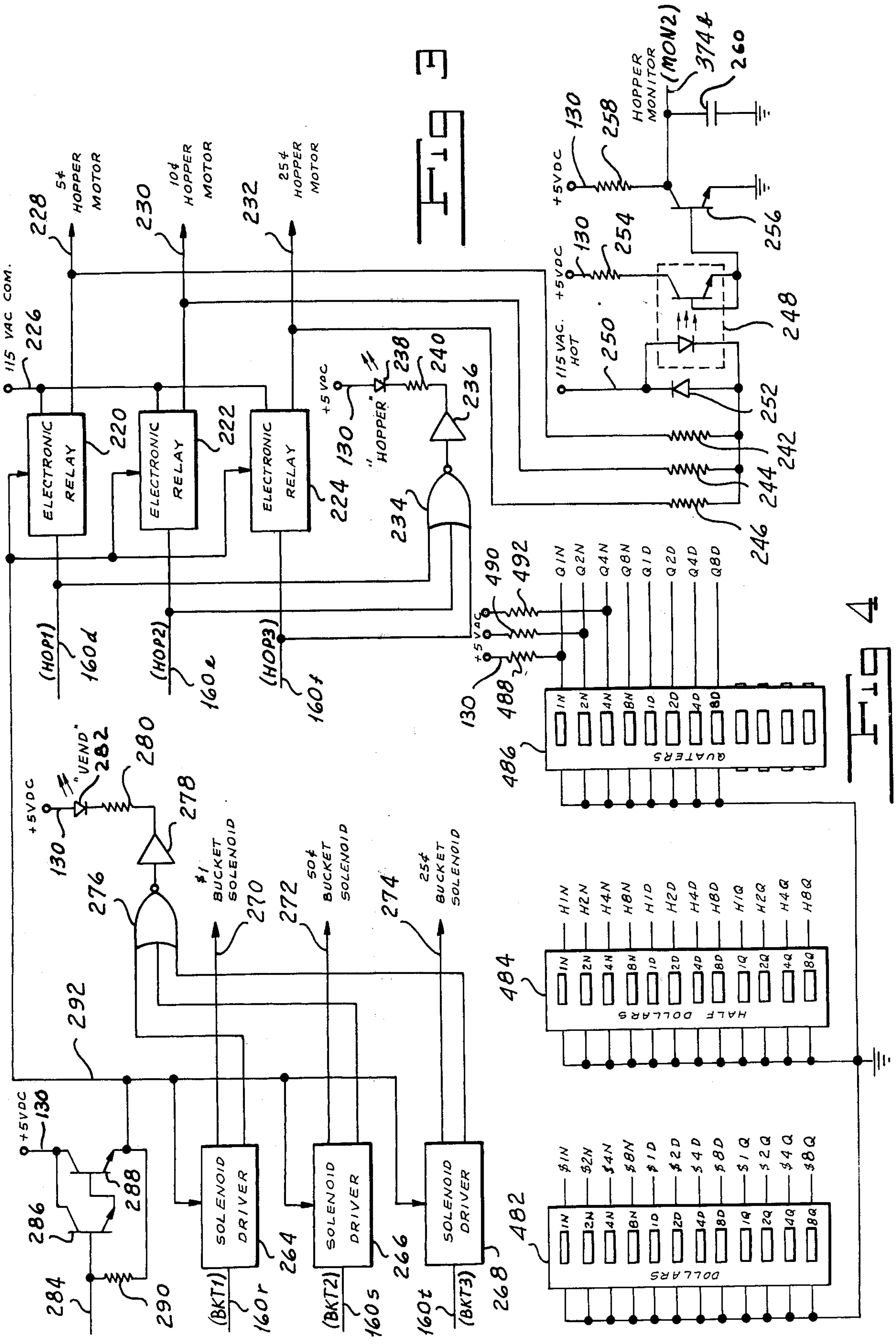
FIG. 4 is a schematic diagram of the change combination program switches associated with the circuit shown in FIGS. 2*a* to 2*c*.

Referring now to FIG. 4, respective banks of program switches 482, 484 and 486 are used to set the desired change combination for a given bill or coin deposit. More particularly, in a dollar switch bank 482, output lines $1N, $2N, $4N and $8N together provide a four-bit signal indicating the number of nickels to be dispensed in response to the deposit of a dollar bill or coin. Similarly, output lines $1D, $2D, $4D and $8D together provide a four-bit signal indicating the number of dimes to be dispensed in response to the deposit of a dollar bill or coin. Finally, outputs $1Q, $2Q, $4Q and $8Q together provide a four-bit signal indicating the number of quarters to be dispensed in response to the deposit of a dollar bill or coin.

In a similar manner, outputs H1N–H8Q of half-dollar switch bank 484 provide three four-bit signals indicating respectively the number of nickels, the number of dimes and the number of quarters to be dispensed in response to the deposit of a half-dollar. Likewise, outputs Q1N–Q8D of a quarter switch bank 486 provide two four-bit signals indicating respectively the number of nickels and the number of dimes to be dispensed in response to the deposit of a quarter. All of these output lines are normally held at a high logic level by pull-up resistors similar to resistors 488, 490 and 492 but are grounded in response to actuation of particular switch. As an illustration of the manner in which these output lines encode the desired change combination, grounding output line $4Q while leaving the remaining lines of dollar switch bank 482 at a high potential will signal that four (0100 in binary) quarters are to be dispensed in response to the deposit of a dollar bill or coin. I couple the 32 output lines of switch banks 482–486 to the input pins of data selectors 354 and 356 to permit the change combination settings to be read by suitably actuating output pins P20–P23 of microcomputer 122.

Referring now to FIG. 8, in the power supply circuit for the control circuits shown in FIGS. 2 through 7, respective input lines 226, the "115 volt common" line, and 494, carrying a line voltge of 115 volts AC, feed the primary winding of a power transformer 496 having a 30 volt secondary winding and a 11.5 volt secondary winding. A normally closed switch 497 controlled by a relay coil 538 couples line 494 to "115 volt hot" line 250. The 30 volt winding of transformer 496, one end of which is grounded, provides the input to a high-current power supply 498. Power supply 498 provides a +30 volt regulated DC output to line 429 through a normally closed switch 504 controlled by relay coil 538. A "30 volt" LED 500 coupled between the 30 volt output of power supply 498 and ground through a resistor 502 indicates the presence of an output on the power supply line feeding line 429.

The ungrounded terminal of the 30 volt winding of transformer 496 drives a "30 volt AC" line used to energize bill transport motor 28 through a normally closed switch 506 also controlled by relay coil 538. A rectifier diode 508 coupled to the 30 volt AC line provides a DC output filtered by capacitor 510. I connect this output to the 40 volt DC line 388 through a normally closed switch 516 also controlled by relay coil 538. A 40 volt" LED 512 coupled between the ungrounded terminal of capacitor 510 and ground through a resistor 514 indicates the presence of a voltage on the line feeding line 388.

I couple the 11.5 volt winding of transformer 496 to a low-voltage power supply 518 which provides a 14 volt DC output to line 148. A "14 volt" LED 520 coupled between line 148 and ground through a resistor 522 indicates the presence of a signal on line 148. I also couple line 148 to the input of a voltage regulator 526, the output of which provides the 5 volt DC potential on line 130. Respective filter capacitors 524 and 528 provide AC paths between lines 148 and 130 and ground. Power supply 518 also directly supplies a 5 volt potential to a line 534. A "5 volt" LED 530 coupled between line 534 and ground through a resistor 532 indicates the presence of a potential on line 534.

High-current power supply 498 has an unregulated DC output which I couple to one terminal of relay coil 538 through a resistor 536. I couple the other terminal of relay coil 538 to "shut-down relay" line 170 so that coil 538 is energized, opening switches 497, 504, 506 and 516, whenever line 170 drops to ground potential. A shunt diode 540 coupled across relay coil 538 provides a current path when relay coil 538 is de-energized.

Figure 9A:
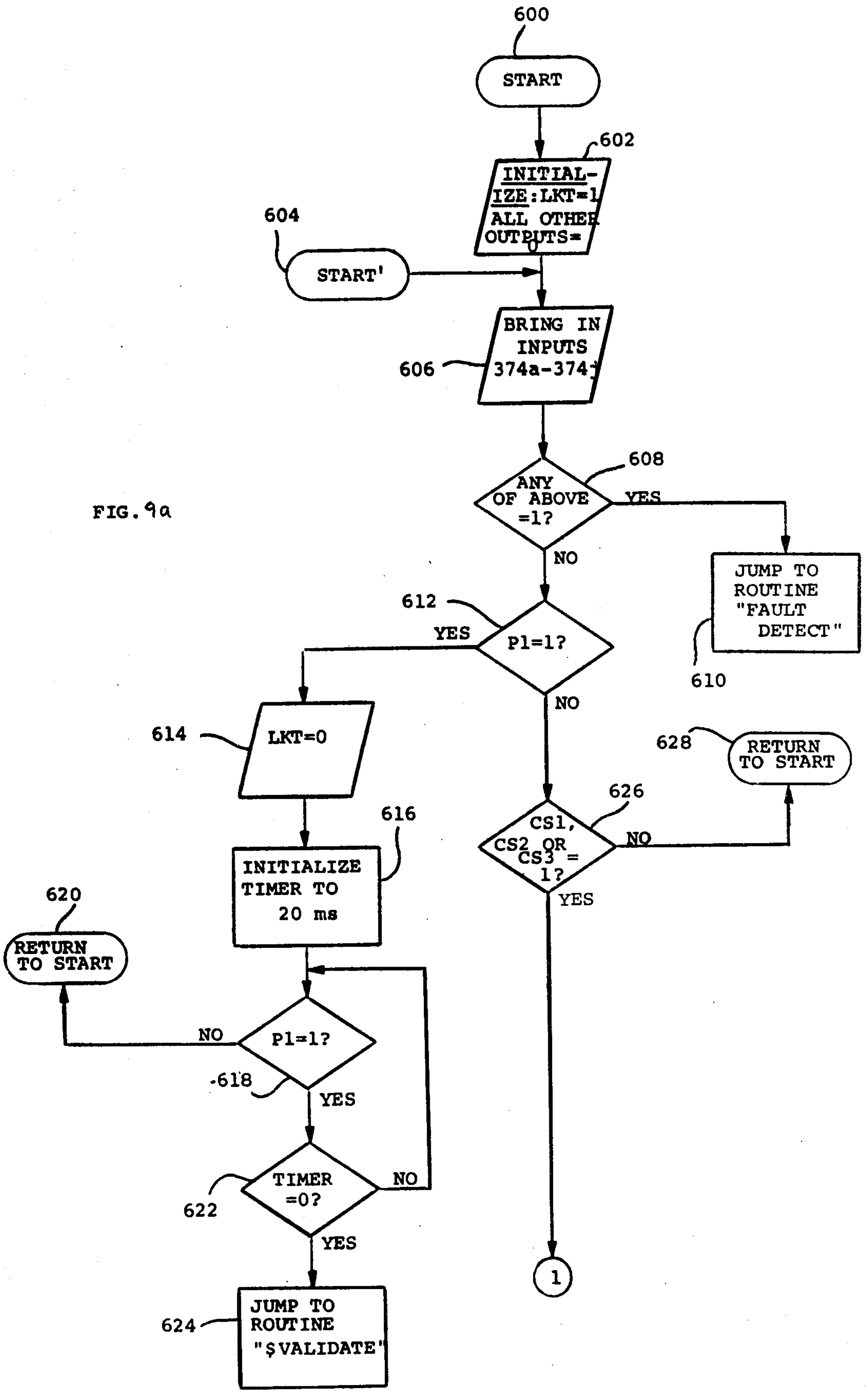
FIGS. 9a to 9c illustrate a flowchart of the main program of the control circuit shown in FIGS. 2a to 2c.
Figure 9B:
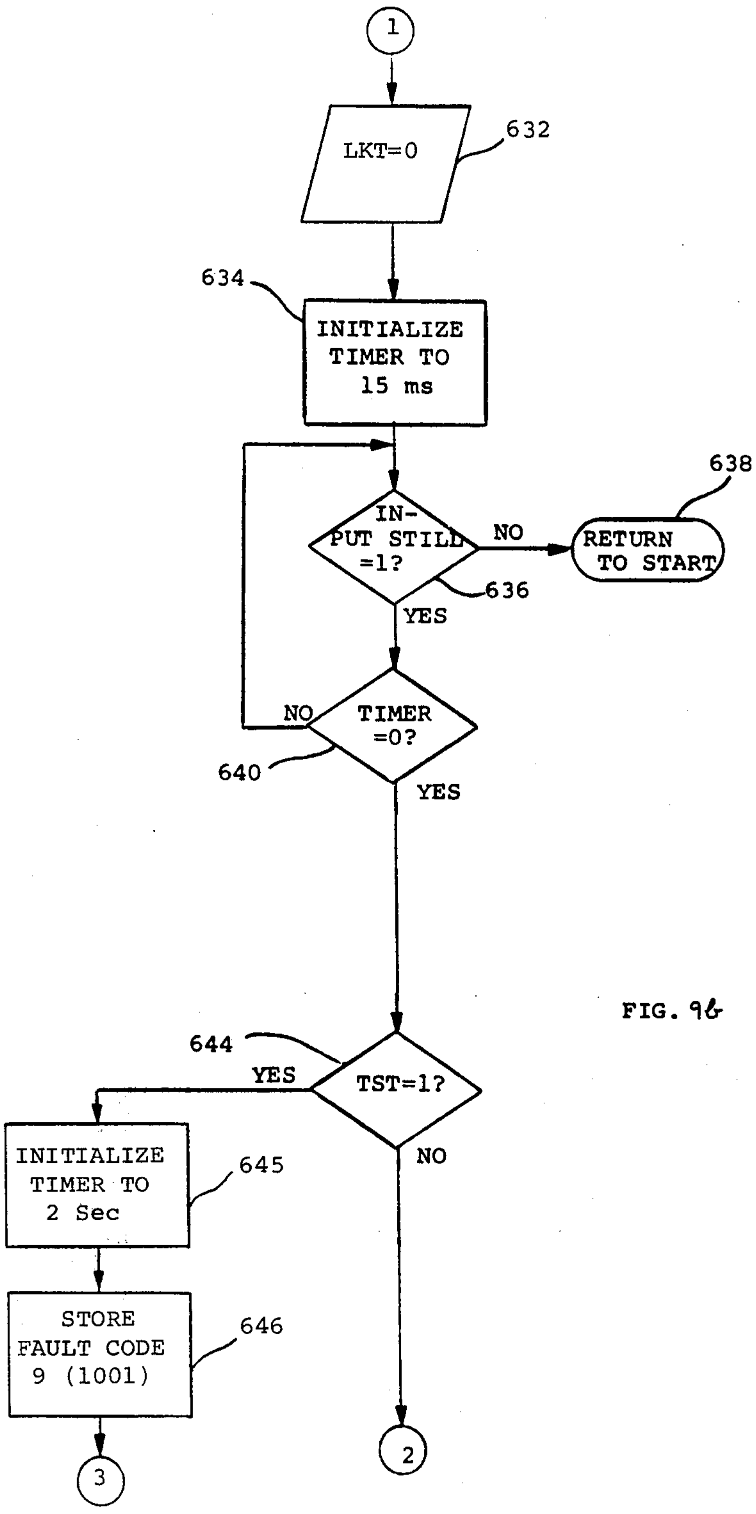
Figure 9C:
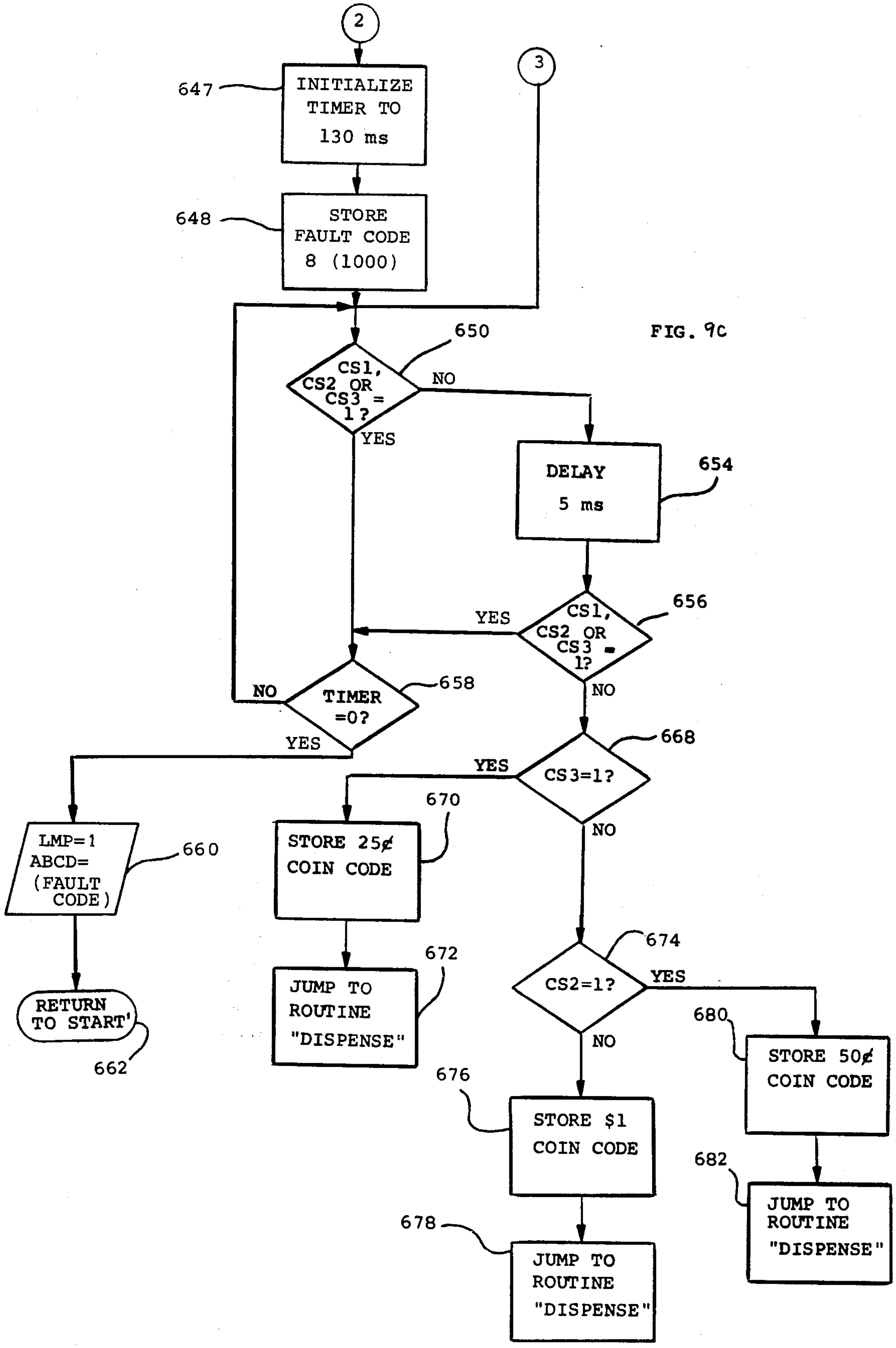

Referring now to FIGS. 9*a* to 9*c*, the main program of the bill and coin changer including my improved bill acceptor starts at block 600 with the external interrupt pin INT enabled. Initially (block 602) the coin lockout line LKT is energized to permit the deposit of coins, while all other outputs remain unenergized. A separate entry point 604 is provided after block 602 to permit entry into the main program without energizing the coin lockout solenoid. After the initialization step, the inputs 374*a*–374*j* are sequentially scanned to see whether any of them are active (blocks 606 and 608). If any of these inputs are active, the program jumps (block 610) to a "fault detect" routine, as none of the inputs should be active at this time.

In the "fault detect" routine entered from this block, shown and described in the copending application of Larry E. Steiner, Ser. No. 74,992, filed Sept. 13, 1979, the various inputs on lines 374*a* to 374*c* and 374*e* to 374*j* are examined to see if any are prematurely active. If none are, the routine returns to block 600 of the main program.

Next, the P1 photocell input is interrogated to see whether it is active (block 612). If P1 is active, the coin lockout line LKT is de-energized (block 614) to prevent coins from being deposited and a timer (not shown) internal to microcomputer 122 is initialized to 20 milliseconds (block 616). If input P1 changes to an inactive state at any time during this 20 ms period (block 618), the program returns to start (block 620) on the assumption that the input P1 was spuriously actuated. If, on the other hand, input P1 remains actuated at the end of a 20 ms period (block 622), the program jumps to the "$ validate" routine shown in FIGS. 10*a*–10*k* (block 624).

If at block 612 input P1 is inactive, the microcomputer then examines the coin switch inputs CS1–CS3 (block 626) to see whether any of them are active. If none of the coin switch inputs are active, the program returns (block 628) to the starting block 600. If, on the other hand, such as input does appear, the program de-energizes the coin lockout line LKT (block 632) to prevent further coins from being deposited and initializes the timer to 15 ms (block 634). If the input that was formerly active becomes inactive before the end of this 15 ms period, the program again returns to the starting block 600 (blocks 636 and 638).

If the timer reaches zero with a coin switch input still active (block 640), the TST input is tested (block 644) to see whether the CS input is due to the actual deposit of a coin or merely to the simulation of such a deposit by the serviceman. If the deposit is only a simulated deposit, the program initializes the timer to 2 seconds (block 645), stores a fault code of 9 (block 646), and jumps to block 650. If the test input is inactive, the microcomputer initializes the timer to 130 ms (block 647) and stores a fault code of 8 (block 648) before also jumping to block 650.

At this point the program traces a loop comprising blocks 650 to 658 while the timer times out. If, before the timer reaches zero, the coin inputs become inactive and remain so after a 5 ms delay (blocks 650, 654 and 656), the program exits from the loop and resumes along its normal path. If, on the other hand, one or more coin inputs are still active when the timer reaches zero (blocks 650 and 658), the program energizes the out-of-service lamp line LMP and outputs an appropriate fault code on lines A-D to indicate that a particular coin switch was actuated too long (block 660). Thereafter the program returns to block 604 (block 662).

If the coin switch input was actuated for the proper length of time, the program next asks whether the input CS3 was the active input (block 668), and, if so, stores a 25-cent coin code in a "coin code" register (not shown) of microcomputer 122 (block 670) and jumps (block 672) to a "dispense" routine shown and described in the above-identified copending application of Larry E. Steiner, which controls the dispensing of change. This routine, upon completion, also returns to block 600 of the main program. If the actuated input was the 50-cent input (block 674), the program stores a 50-cent coin code in the coin code register (block 680) and jumps to the routine "dispense" (block 682). Otherwise, the program stores a one-dollar coin code in the coin code register (block 676), as this is the only remaining possibility, and jumps to the routine "dispense" (block 678).

Figure 10A:
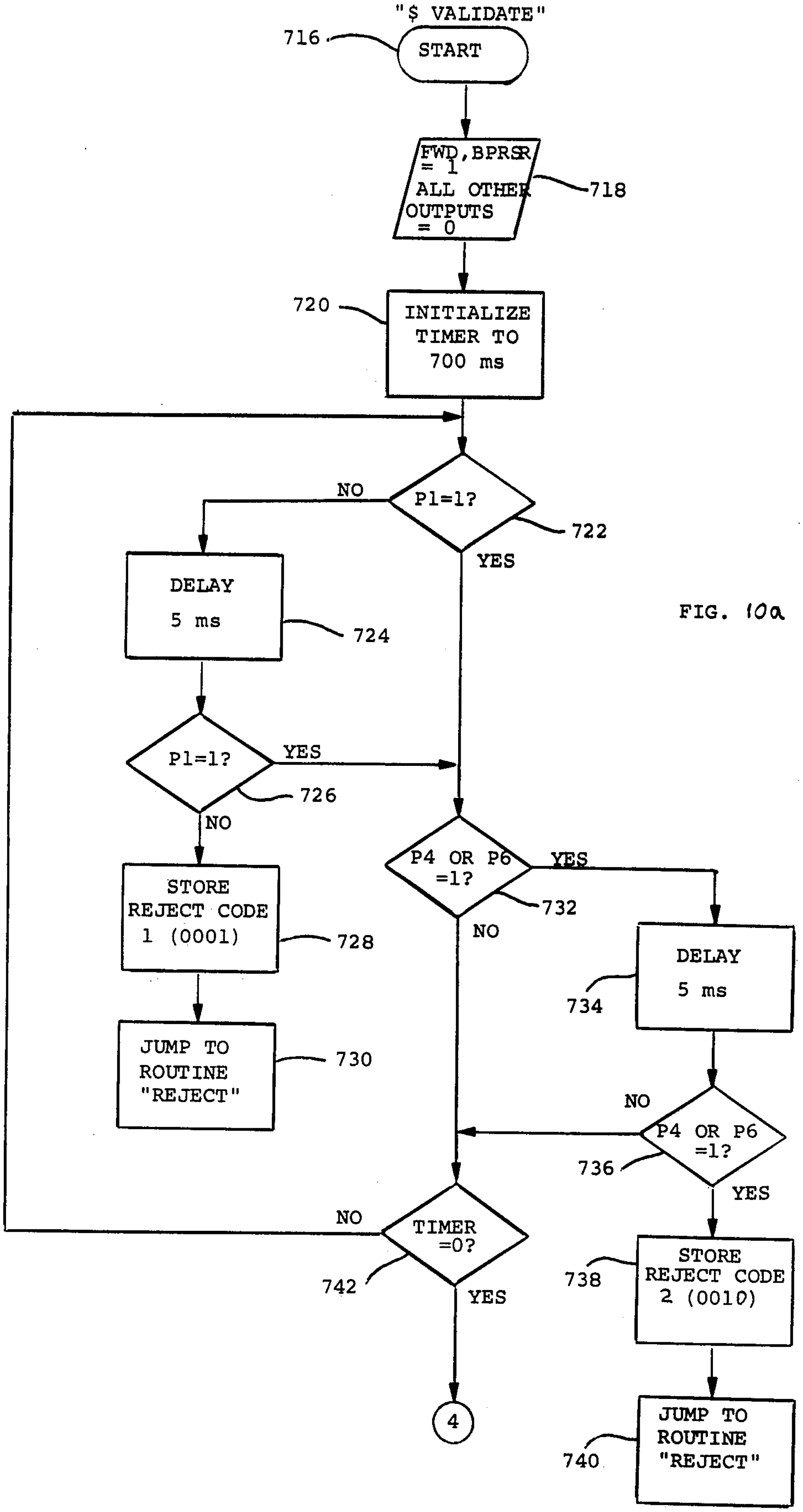
FIGS. 10a to 10k illustrate a flowchart of the bill-validating routine of the control circuit shown in FIGS. 2a to 2c.
Figure 10B:
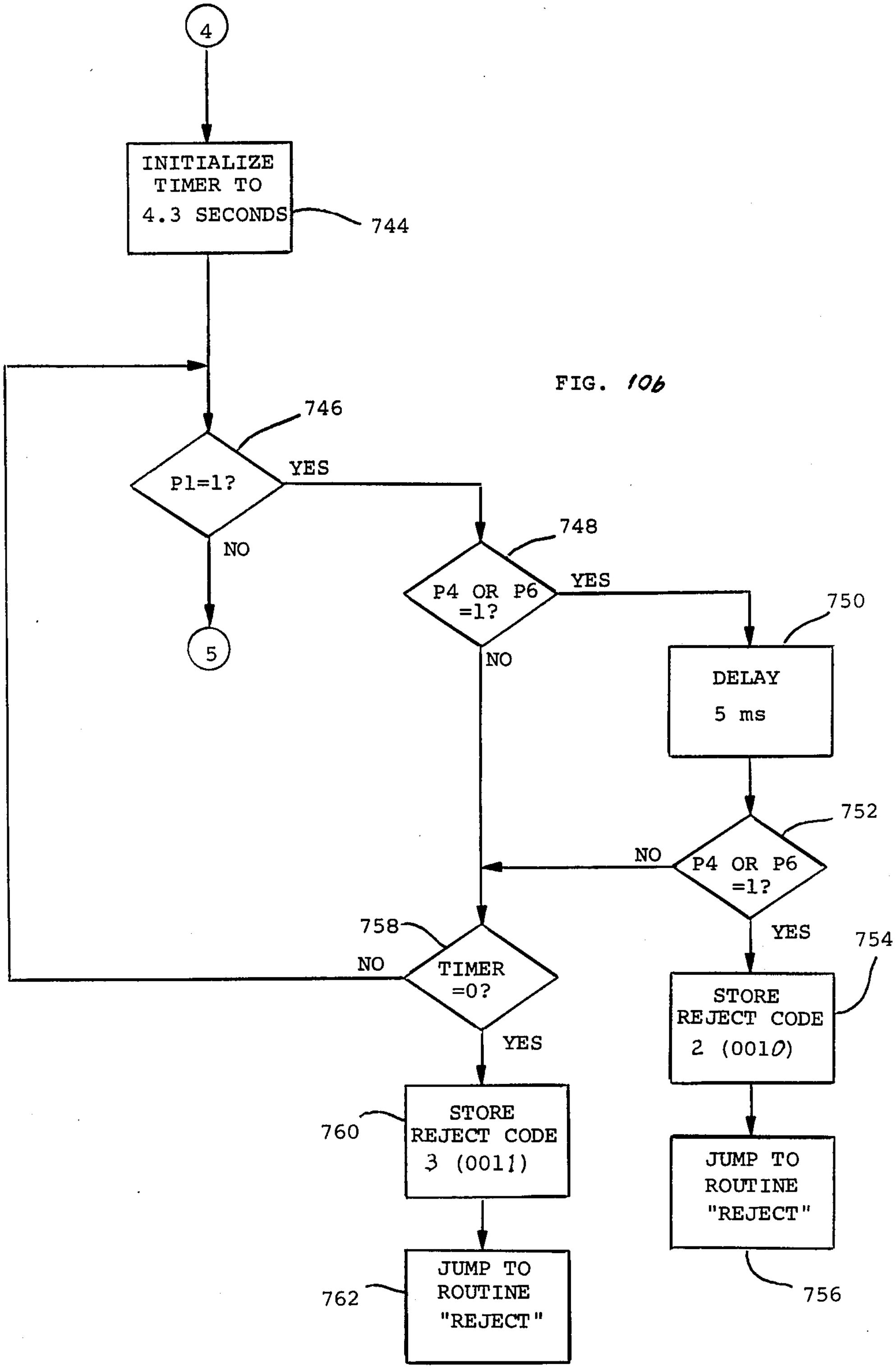
Figure 10C:
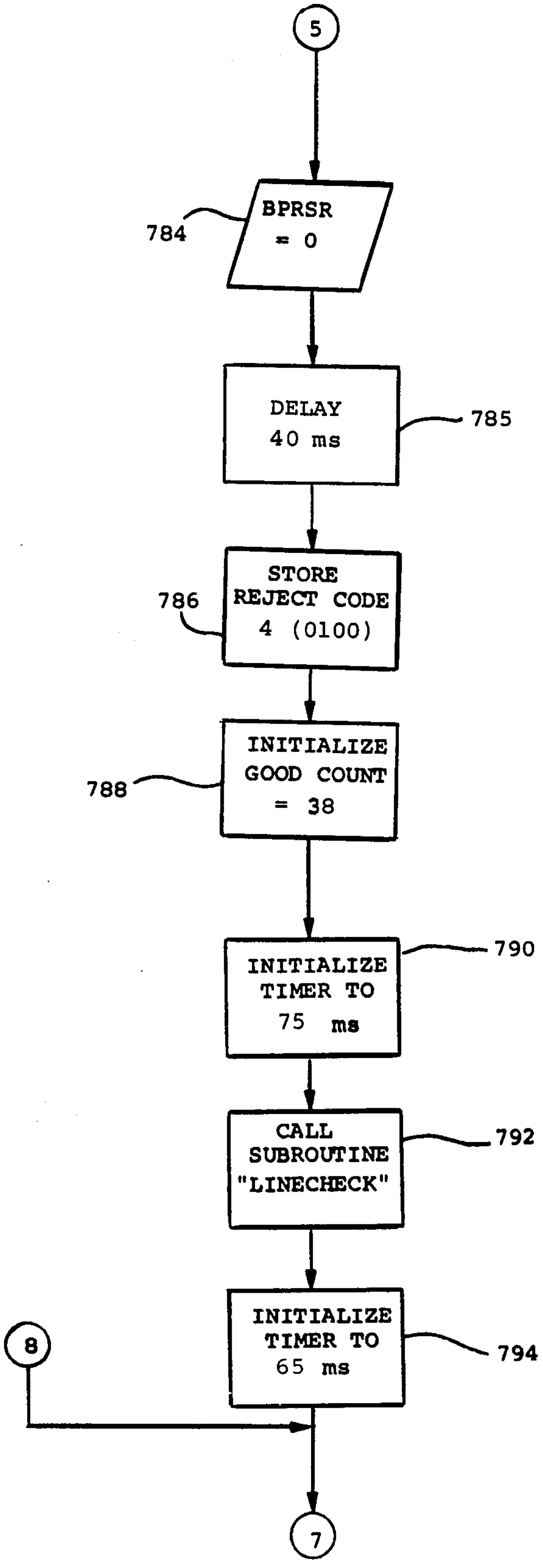
Figure 10D:
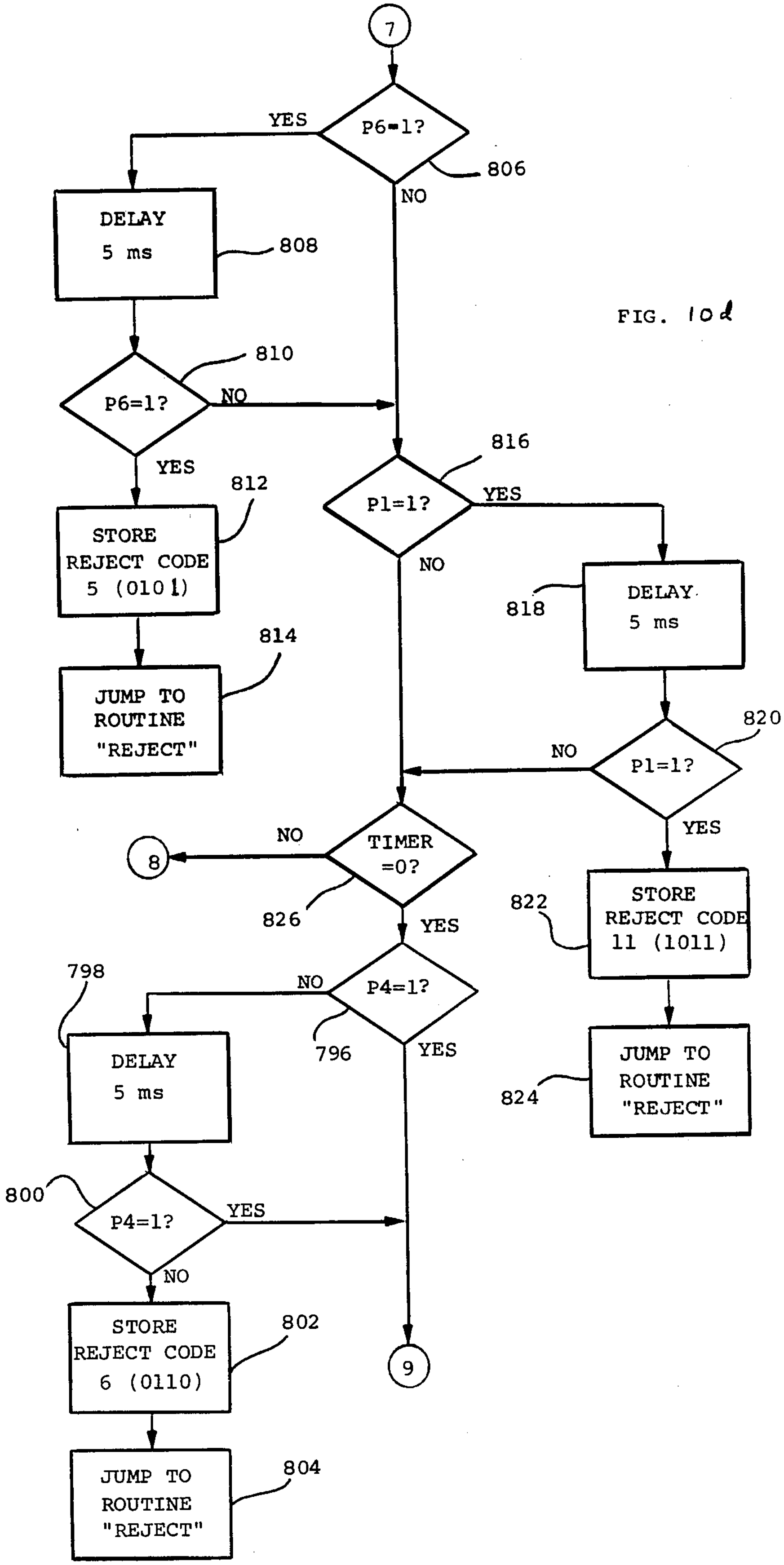
Figure 10E:
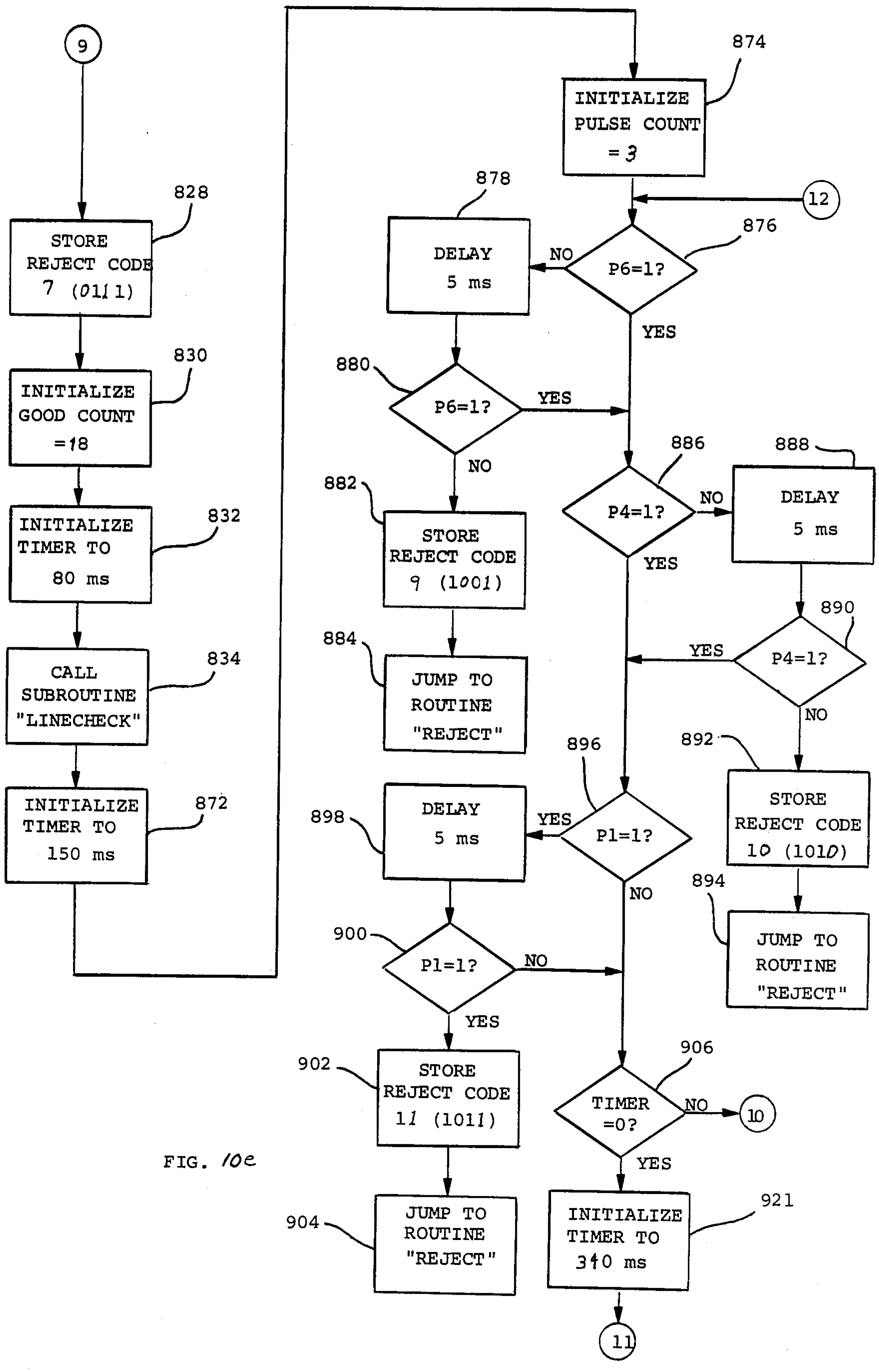
Figure 10F:
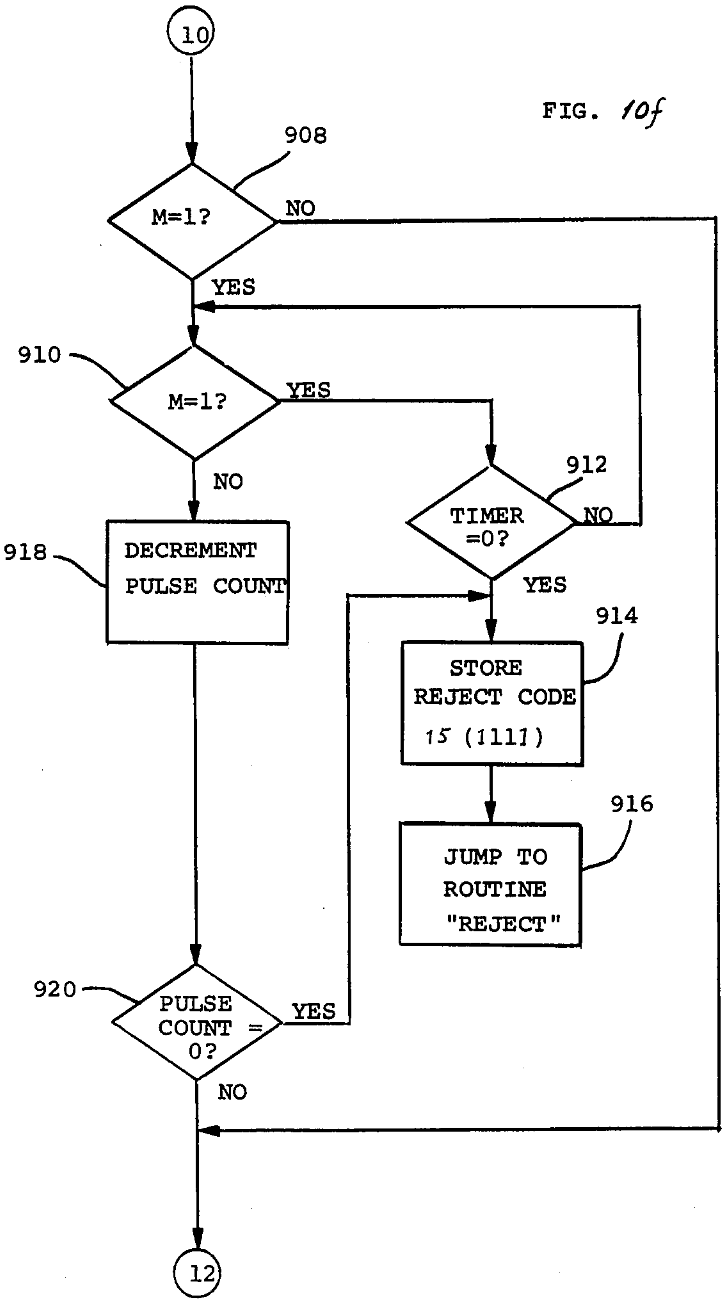
Figure 10G:
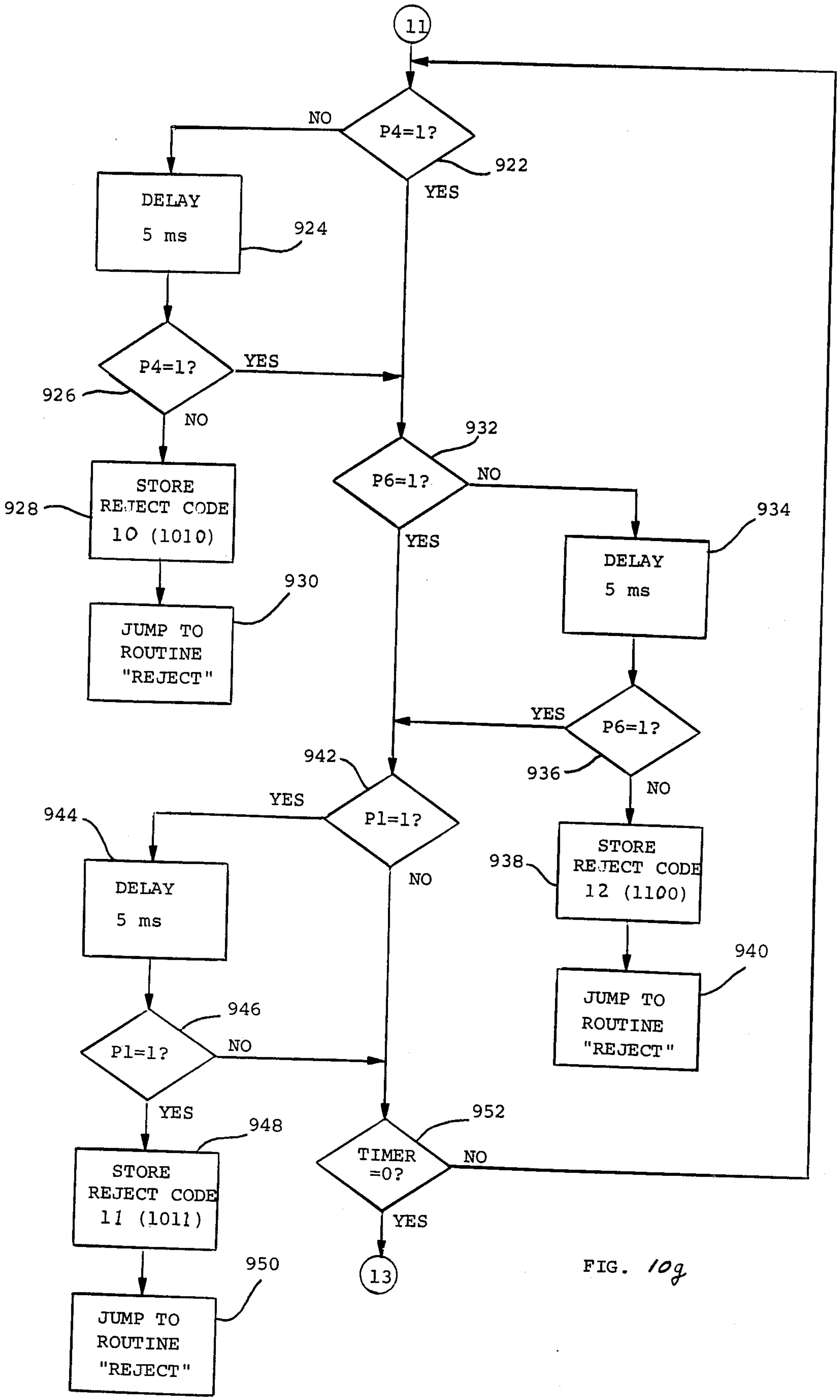
Figure 10H:
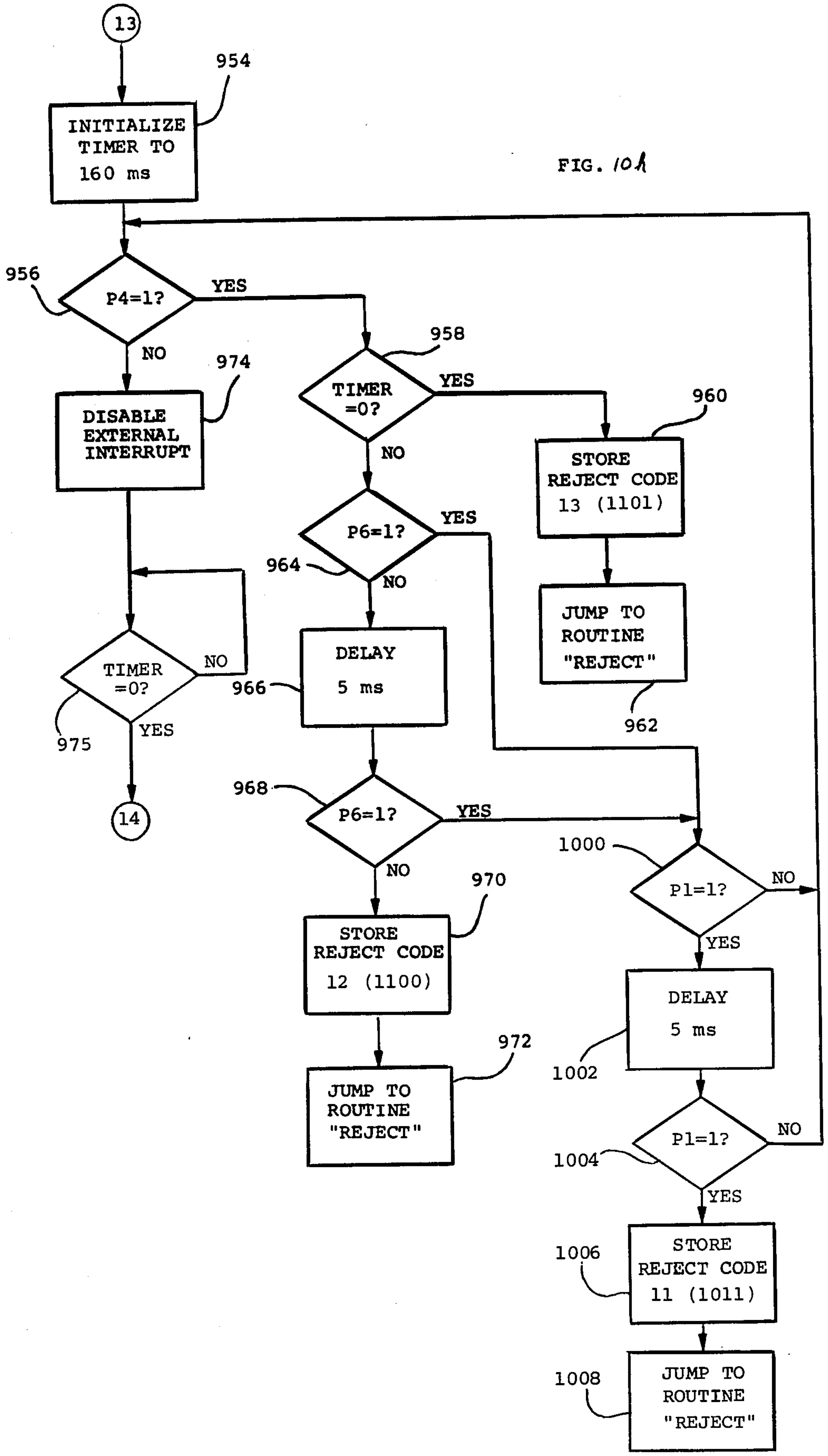
Figure 10I:
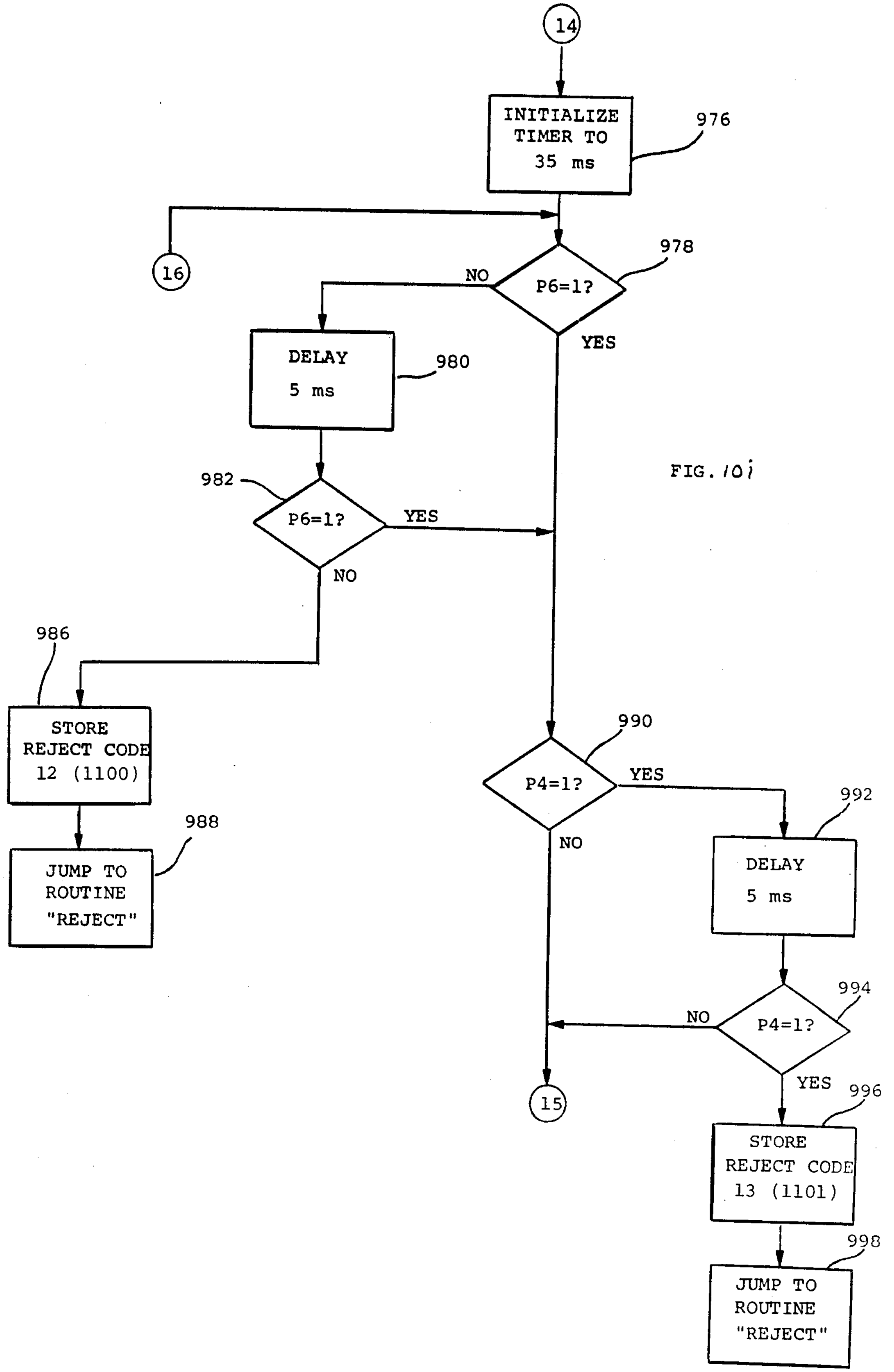
Figure 10J:
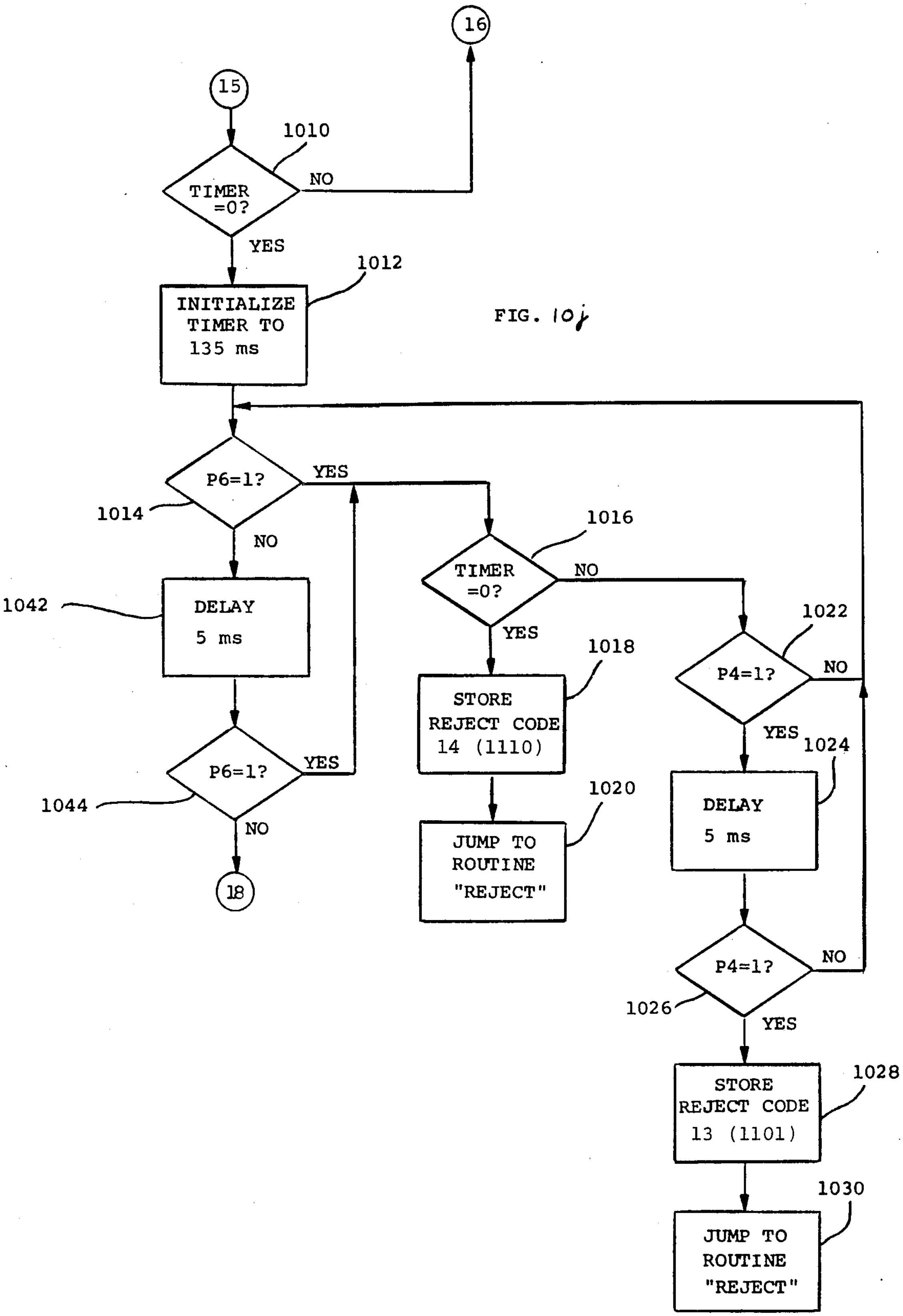
Figure 10K:
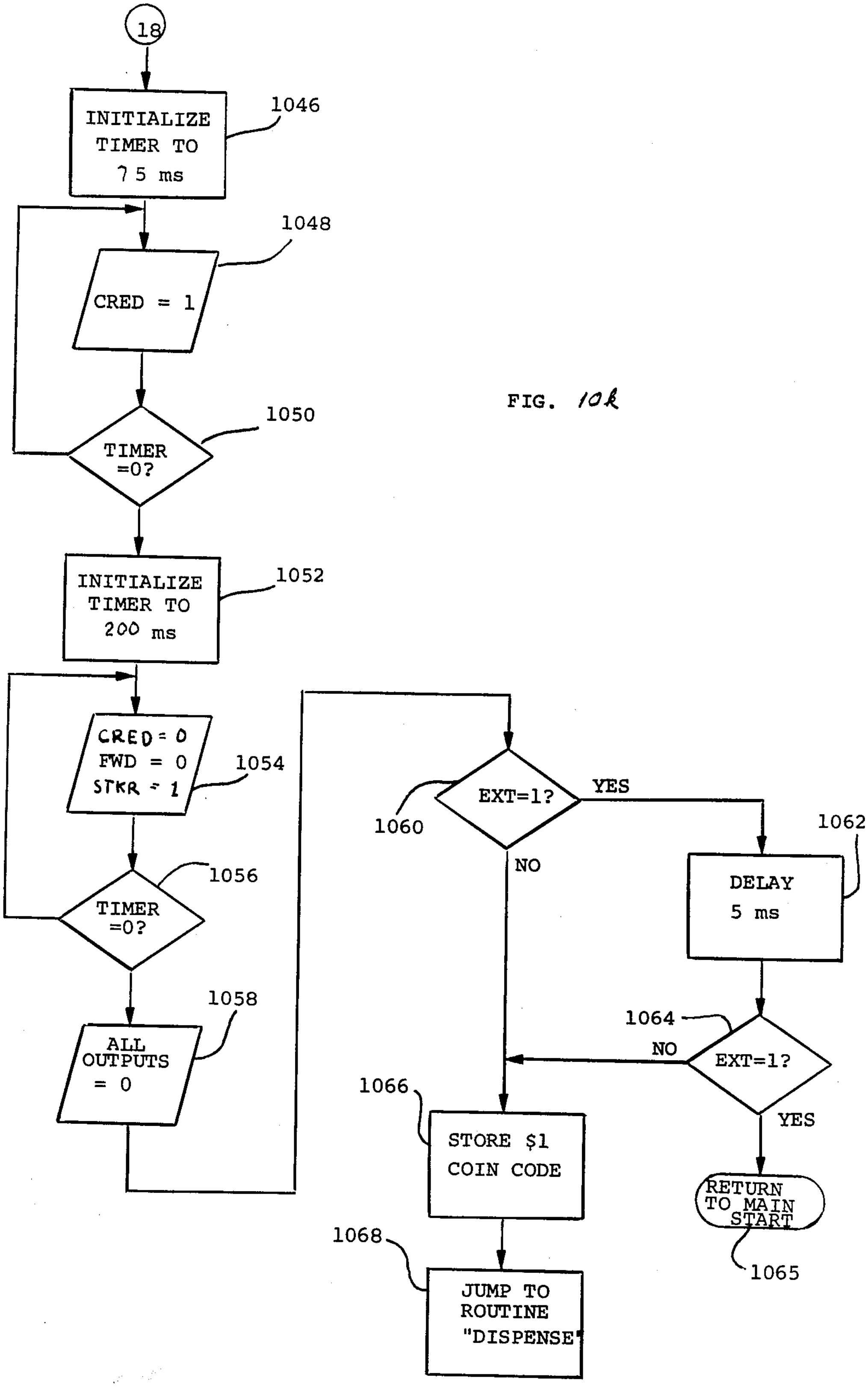

As previously mentioned, the "$ validate" program beginning at block 716 of FIG. 10*a* is entered whenever the input P1 remains active for more than 20 milliseconds (blocks 616–624). Initially, the FWD output is energized to drive the inserted bill in a forward direction, while the BPRSR output is energized to move the pressure roller 64 away from the magnetic head 62 during initial part of the routine (block 718). Next, a timer is initialized to define a 700 ms interval (block 720). If, within this interval, input P1 becomes inactive and remains inactive after a 5 ms delay (blocks 722, 724 and 726), a reject code of 1 is stored (block 728) and the routine "$ validate" jumps to the routine "reject" shown in FIG. 12 (block 730). Further, if within this test interval either of the inputs P4 or P6 becomes active and remains active after a 5 ms delay (blocks 732, 734 and 736), a reject code of 2 is stored (block 738) and the routine "$ validate" again jumps to the routine "reject" (block 740). This first test interval thus rejects bills which are too short (i.e., less than about 5 inches) or where the cells P4 or P6 are actuated before they should be. The 5 ms delays (blocks 724 and 734) incorporated in this and subsequent tests in the "$ validate" routine are intended to ensure against an erroneous result as a result of noise.

After the first length test, I subject the inserted bill to an additional test to determine whether it is too long. I first initialize a timer to 4.3 seconds (block 744) to define a test interval which is terminated either at the end of the 4.3 second period or when input P1 again becomes inactive (block 746) signifying the passage thereby of the trailing edge of the bill. If, within this interval, either of the inputs P4 or P6 becomes active and remains so after a 5 ms delay (blocks 748, 750 and 752), the routine stores a reject code of 2 (block 754) and jumps to the "reject" routine (block 756). Entry into this part of the program indicates an erroneous sequence of inputs, since the cell P1 is spaced farther apart from cells P4 and P6 than the length of a one-dollar bill. Also, if at the end of the 4.3 period, the P1 input is still active (block 758), the program stores a reject code of 3 (block 760) and jumps to the "reject" routine (block 762).

If the program successfully exits (block 746) from this portion of the test, the inserted bill is in a proper position for the first line check to determine the spacing between the vertical lines in the background portion of one side of the portrait. Initially, (block 784) the output BPRSR is de-energized to allow roller 64 to urge the bill against the magnetic head 62. After a 40 ms delay (block 785), the program stores (block 786) a reject code of 4, initializes (block 788) a "good count" register, internal to microcomputer 122, to 38, and initializes (block 790) a timer to 75 ms before transferring (block 792) to the subroutine "line check" (FIG. 11) to be described.

After exiting from this subroutine, the program initializes a timer to 65 ms (block 794) and enters a loop (blocks 806–826) during which the inputs P1 and P6 are checked while waiting for the second magnetic test. At this point in the program, the leading edge of a normal bill should be about $\frac{1}{3}$ of an inch beyond the cell P4. If input P6 is active and remains so after a 5 ms delay (blocks 806, 808 and 810), the program stores a reject code of 5 (block 812) and transfers (block 814) to the routine "reject", as cell P6 should not be active at this time. If cell P1 is active and remains so after a 5 ms delay (blocks 816, 818 and 820), the program stores a reject code of 11 (block 822) and transfers to the "reject" routine (block 824). After exiting from this waiting loop (block 826), the program examines the input P4. If input P4 becomes inactive and remains so after a 5 ms delay (blocks 796, 798 and 800), the program stores (block 802) a reject code of 6 and transfers (block 804) to the routine "reject". The program then stores (block 828) a reject code of 7, initializes the "good count" register (block 830) to 18, and initializes (block 832) a timer to 80 ms before transferring again to the subroutine "line check" (block 834).

Figure 11:
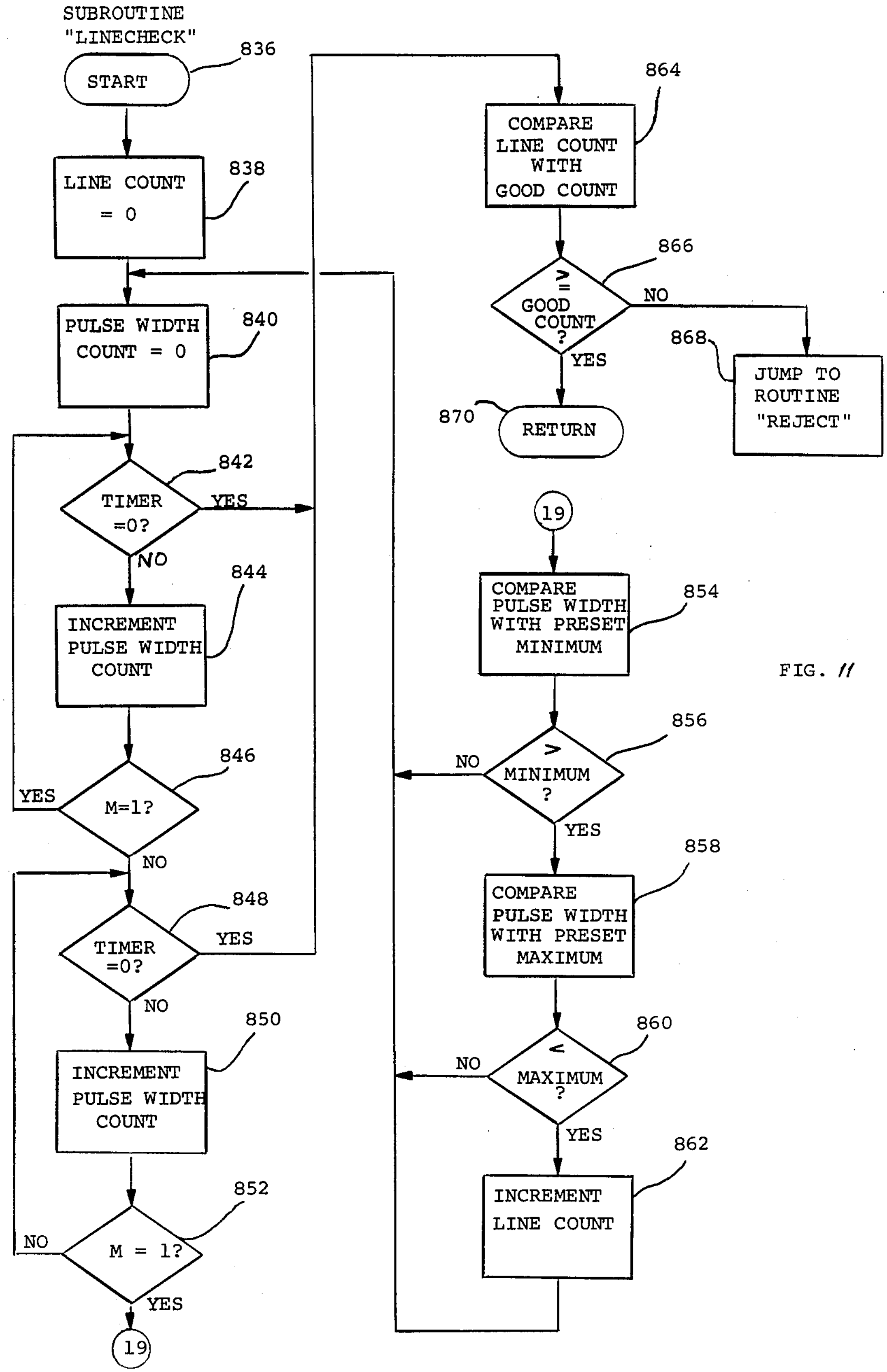
FIG. 11 illustrates a flowchart of the line-checking subroutine of the bill-validating routine shown in FIGS. 10a to 10k.

I show the "line check" subroutine in FIG. 11. After entering the subroutine (block 836), the program clears an internal "line count" register (block 838) and "pulse width count" register (840) in preparation for counting vertical lines. The program then enters a first loop (blocks 842, 844 and 846) in which the pulse width count register is incremented (block 844) periodically until the program exits from the loop in response to a low input on the M line (block 846). The program then enters a second loop (blocks 848, 850 and 852) in which the pulse width count register is further incremented periodically until the program exits from that loop in response to a high input on the M line (block 852).

At this point, the content of the pulse width count register, which is proportional to the spacing between the two last leading edges of the M input, is compared (blocks 854 and 858) both with a predetermined minimum pulse width and a predetermined maximum pulse width before returning to block 840 to measure a second pulse. If the pulse width count is both greater than the predetermined minimum (block 856) and less than the predetermined maximum (block 860), the line count register is incremented (block 862) and the program returns to block 840 to measure the spacing of the next leading pulse edge. If the pulse width count does not fall within this range, the program simply returns to block 840 without incrementing the line count register.

The background portion of the portrait area of a genuine U.S. one-dollar bill contains about 110 vertical lines per inch. These vertical lines are spaced from each other by about 9.0 mils. Since higher-denomination U.S. bills have less closely spaced vertical lines, and since it is desirable to be able to reject these bills as well as counterfeit bills, the range of acceptable pulse spacings is preferably asymmetrically placed about the average so that line spacings between about 6.3 mils, or 30% below average, and 9.9 mils, or about 10% above average, are accepted.

When the timer reaches zero (blocks 842 and 848), the program stops measuring pulses and compares (block 864) the content of the line count register with that of the "good count" register, which is preset at a count equal to about 80% of the lines scanned on a particular pass through the "line check" subroutine. To allow for variations in alignment of the printed matter on the front of the bill relative to the leading edge of the bill, each pass through the "line check" routine is so timed as to scan a zone along the strip traversed by head 62 that is somewhat longer at each end than the strip portion normally containing the vertical lines. If the line count is less than the predetermined "good count", the subroutine jumps (blocks 866 and 868) to the "reject" subroutine. Otherwise the program returns (block 870) to the next point in the "$ validate" program.

After the program leaves the "line check" subroutine the second time, the timer is initialized (block 872) to 150 ms to define a period in which a further magnetic test is conducted. At this point the magnetic head 62 is beginning to traverse the serial number and Federal Reserve seal region of the bill, which on a genuine bill are printed with non-magnetic ink. A "pulse count" register is also initialized (block 874) to a count of 3. The program then enters a loop (blocks 876–920) from which it exits (block 906) when the timer reaches zero. If, on any pass of this loop, the P6 input becomes inactive and remains so after a 5 ms delay (blocks 876, 878 and 880), the program stores a reject code of 9 (block 882) and transfers (block 884) to the "reject" routine. Similarly, if on any pass through the loop, the input P4 is inactive and remains so after a 5 ms delay (blocks 886, 888 and 890), the program stores a reject code of 10 (block 892) and jumps (block 894) to the "reject" routine. Likewise, if on any pass through the loop, input P1 becomes active and remains active after a 5 ms delay (blocks 896, 898 and 900), the program stores a reject code of 11 (block 902) and jumps (block 904) to the "reject" routine.

If, on a given pass after the above tests are performed, the magnetic input M is found to be active (block 908), the program enters a waiting loop (blocks 910 and 912) which it exits when either the magnetic input M becomes inactive (block 910) or the timer reaches zero (block 912). If the latter event occurs, the program stores a reject code of 15 (block 914) and jumps (block 916) to the "reject" routine. If, on the other hand, the magnetic input M again becomes inactive in this loop, the pulse count register is decremented (block 918) and examined (block 920) to determine whether its content is now zero. If the updated pulse count register content is zero, indicating that three magnetic pulses have been detected within the test interval, the program jumps to blocks 914 and 916, described above. Otherwise the program simply returns to block 876 to complete another pass of the loop.

After the program exits the loop from block 906, the timer is re-initialized to 340 ms (block 921) to define a time interval during which the program traverses a further loop comprising blocks 922–952. During this portion of the passage of the inserted bill, inputs P4 and 96 should be active while input P1 should be inactive. Any sensed deviation from this normal state will cause the bill to be rejected. If, on any pass of this loop, input P4 is inactive and remains so after a 5 ms delay (blocks 922, 924 and 926), the program stores a reject code of 10 (block 928) and jumps (block 930) to the "reject" routine. Similarly, if one any pass of this loop, input P6 is found to be inactive and remains so after a 5 ms delay (blocks 932, 934 and 936), the program stores a reject code of 12 (block 938) and again jumps to the "reject" routine (block 940). Finally, if input P1 is found to be active and remains so after a 5 ms delay (blocks 942, 944 and 946), the program stores a reject code of 11 (block 928) and also jumps to the "reject" routine (block 950).

If a genuine bill has been inserted, input P4 should change to an inactive state approximately 30 ms after the program exits from the above-described loop at block 952. To sense whether this in fact occurs, the program first initializes (block 954) the timer to 160 ms. The program then enters a loop comprising blocks 956–972 from which it exits when the input P4 becomes inactive. If, on any pass through this loop, input P6 is found to be inactive and remains so after a 5 ms delay (blocks 964, 966 and 968), the program stores a reject code of 12 (block 970) and jumps to the "reject" routine (block 972). If, during any pass input P1 is found to be active and remains so after a 5 ms delay (blocks 1000, 1002 and 1004), the program stores a reject code of 11 (block 1006) and jumps (block 1008) to the "reject" routine. If, at the end of the 160 ms period, input P4 is still active (blocks 956 and 958), the program stores a reject code of 13 (block 960) and jumps to the "reject" routine (block 962).

After input P4 becomes inactive, causing the program to exit from the above-described loop (block 956), the program disables (block 974) the external interrupt line 150 to prevent induced bill rejection after this point, and waits (block 975) for the timer to reach zero. Next, the program initializes (block 976) the timer to 35 ms to define a time period during which input P6 should return to an inactive state. During this portion of the program, the P4 photocell should not be covered. If, during any pass of the loop comprising blocks 970–1010, input P4 should be found to be active and remains so after a 5 ms delay (blocks 990, 992 and 994), the program stores a reject code 13 (block 996) and jumps (block 998) to the "reject" routine. If on any pass through the loop, input P6 is found to be inactive and remains so after a 5 ms delay (blocks 978, 980 and 982), the program stores a reject code of 12 (block 986) and jumps to the "reject" routine (block 988).

After exiting this loop comprising blocks 970–1010 (block 1010) the program re-initializes the timer to 135 ms (block 1012) to define a 135 ms period within which the cell P6 should uncover. During this time interval, the program traverses a loop comprising blocks 1014–1030. If a normal bill has been inserted, the program exits from this loop before the timer counts to zero when the P6 input becomes inactive and remains so after a 5 ms delay (blocks 1014, 1042 and 1044). If the timer reaches zero before input P6 returns to an inactive state (block 1016), the program stores a reject code of 14 (block 1018) and jumps (block 1020) to the "reject" routine. If on any pass of the loop, input P4 should be found to be active and remains so after a 5 ms delay (blocks 1022–1026), the program stores a reject code of 13 (block 1028) and jumps to the "reject" routine (block 1030).

Upon exiting from the above loop, the program has completed its sequence of tests on the inserted dollar bill and is now ready to begin the acceptance procedure. To this end, the program again initializes the timer (block 1046) to 75 ms to define a time interval during which outputs are provided on the CRED line (block 1048) to generate a credit signal on line 218 to be used by optional external apparatus. At the end of this period (block 1050), the timer is initialized to 200 ms (block 1052) to define a period during which the CRED and FWD lines are de-energized and the STKR line energized, to actuate the stacker motor (not shown), while all other outputs remain unchanged (block 1054). At the end of this time interval (block 1056) all of the outputs are de-energized (block 1058) and the program examines (block 1060) the external lockout input EXT to determine whether the external apparatus is assuming control of the procedure. If a signal appears on the EXT line and remains after a delay of 5 ms (blocks 1060), 1062 and 1064), the program simply returns (block 1065) to the starting point 600 of the main program. If no such signal is detected, the program stores (block 1066) the one-dollar coin code in the coin code register and jumps (block 1068) to the "dispense" routine referred to above.

Figure 12:
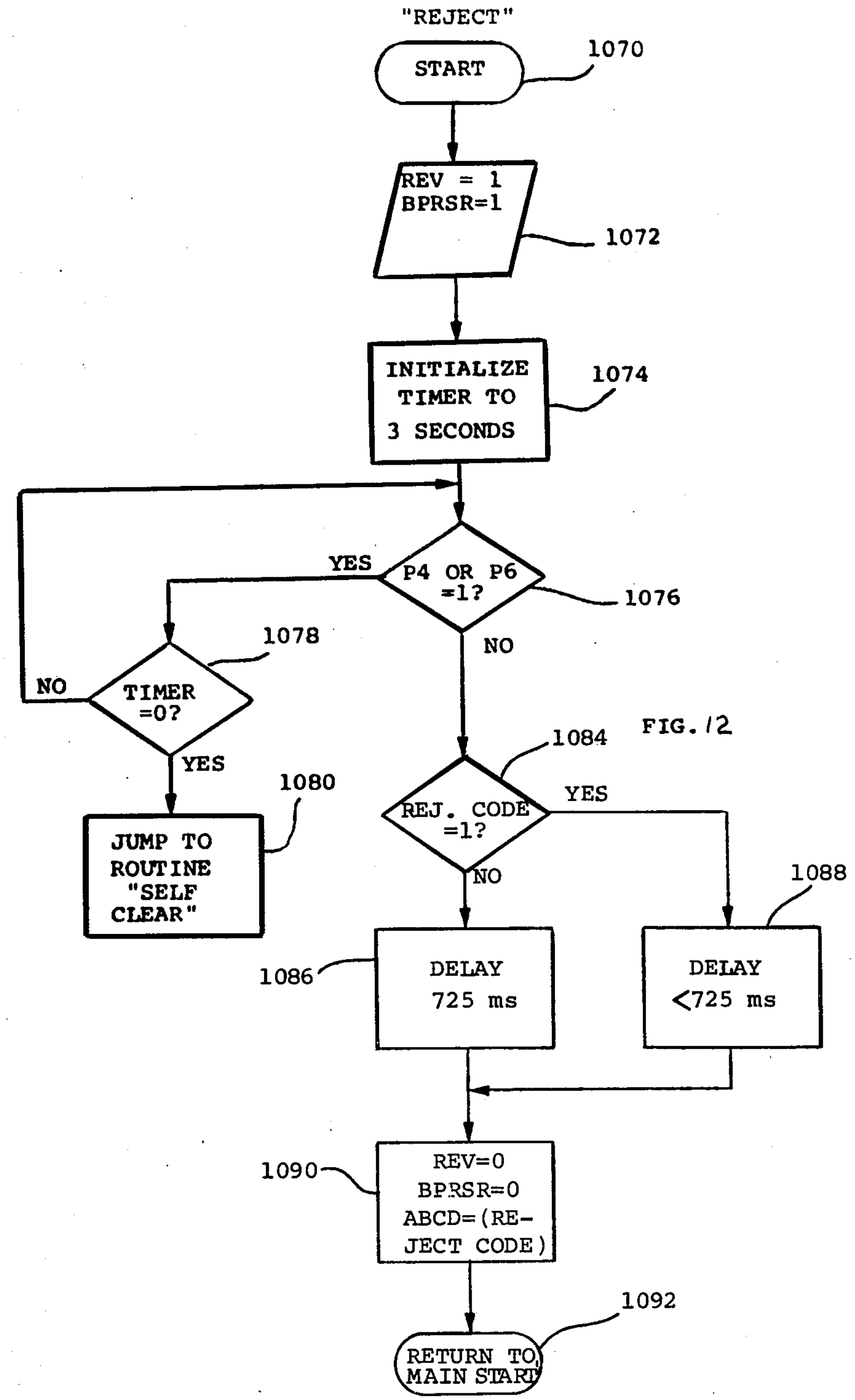
FIG. 12 illustrates a flowchart of the bill-rejecting routine of the control circuit shown in FIGS. 2a to 2c.

Referring now to FIG. 12, the "reject" routine for returning abnormal dollar bills to customers and for displaying the appropriate reject code begins at block 1070. Initially, outputs REV and BPRSR are energized to drive the dollar bill in a reverse direction toward the customer and to move the roller 64 out of the bill transport path (block 1072).

Thereafter the program initializes the timer to 3 seconds (block 1074). If either of inputs P4 or P6 is active at the beginning of this period and remains active until the end of the period (blocks 1076 and 1078), the program jumps (block 1080) to a "self clear" routine on the assumption that an object has become jammed in the bill transport. In this routine, shown and described in the previously identified copending application of Larry E. Steiner, the transport motor is alternately energized in a forward and then reverse direction in an attempt to extricate the jammed object from the transport 10. This routine on successful completion returns to main start block 600.

The program then examines (block 1084) the stored reject code. If the reject code is any number other than 1, the program delays 725 ms (block 1086). If, on the other hand, the reject code is 1, indicating that the condition occasioning rejection of the bill was that it was too short, the program delays for a shorter period (block 1088), as it is not necessary in this case to run the transport motor in reverse for a full 725 ms. After the delay, the program disables the REV and BPRSR lines and provides the appropriate reject code on output lines A–D to display a coded character indicating the nature of the condition occasioning rejection. Finally, the routine returns to block 604 of the main program (block 1092).

It will be seen that I have accomplished the objects of my invention. My paper currency acceptor reliably rejects counterfeit currency while at the same time reliably accepting genuine paper currency even if it has become worn through normal handling. My paper currency acceptor is highly insensitive to variations in electronic circuit parameters and continues to operate reliably when its magnetic sensing head has accumulated a deposit of dirt and grease.

It will be understood that certain features and subcombinations are of utility and may be employed without reference to other features and subcombinations. This is contemplated by and within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. Apparatus for validating paper currency normally containing magnetic ink in certain areas and containing nonmagnetic ink in certain other areas, said apparatus including means for magnetically scanning one of said areas normally containing nonmagnetic ink, said scanning means generating an output on traversing a magnetic portion of said bill, and rejection means responsive to a predetermined number of repetitions of said output following the first such output for generating a signal indicating the unacceptability of said bill, said rejection means remaining inoperative prior to said predetermined number of repetitions of said output.

2. Apparatus as in claim 1 in which said rejection means generates said signal in response to the second repetition of said output following the first such output while remaining inoperative prior to said second repetition of said output.

3. Apparatus for validating a U.S. one-dollar bill having a portrait area with parallel lines normally spaced by a certain distance in the background portion thereof, said apparatus including means for scanning said background portion to produce a train of outputs corresponding to said lines, said outputs being spaced by time intervals corresponding to the distance between said lines, means for counting the number of said time intervals falling within a predetermined range indicative of a genuine bill, said predetermined range of time intervals being centered about a time less than the time required for said scanning means to traverse said certain distance, said counting means being insensitive to time intervals falling outside said range, and acceptance means responsive to said counting means for indicating the acceptability of said bill.

4. Apparatus as in claim 3 in which said predetermined range of time intervals extends from about 30% less to about 10% more than the time required for said scanning means to traverse said certain distance.

5. Apparatus for validating a U.S. bill having a portrait area with spaced parallel lines in the background portion thereof, said apparatus including means for scanning said background portion to produce a train of outputs corresponding to said lines, said outputs being spaced by time intervals corresponding to the distance between said lines, means for counting the number of said time intervals falling within a predetermined range indicative of a genuine bill, said counting means being insensitive to time intervals falling outside said range, and acceptance means responsive to said counting means for indicating the acceptability of said bill.

6. Apparatus as in claim 5 in which said scanning means scans along a path traversing background portions on both sides of the figure in said portrait area.

7. Apparatus as in claim 5 in which said scanning means scans a first background portion on one side of the figure in said portrait area and a second background portion on the other side of said figure, said counting means counting the number of time intervals for each of said portions falling within said predetermined range.

8. Apparatus as in claim 7 in which said acceptance means indicates that said bill is acceptable only if at least a respective predetermined number of time intervals for each of said portions falls within said range.

9. Apparatus as in claim 5 in which said scanning means comprises a magnetic head and means for effecting relative movement between said bill and said head.

10. Apparatus for validating a bill having spaced parallel lines, said apparatus including means for scanning a zone of predetermined length containing said lines to produce a train of outputs corresponding to said lines, said zone being disposed a predetermined distance from an edge of said bill, said outputs being spaced by time intervals corresponding to the distance between said lines, means for counting the number of said time intervals falling within a predetermined range indicative of a genuine bill, said counting means being insensitive to time intervals falling outside said range, and acceptance means responsive to said counting means for indicating the acceptability of said bill.

11. Apparatus as in claim 10 in which said lines are normally found in a certain area relative to said edge of said bill, said zone extending beyond said certain area.

12. Apparatus for validating a bill having an area with spaced parallel lines, said apparatus including means for scanning said area to produce a train of pulse edges corresponding to said lines, said pulse edges being spaced by time intervals corresponding to the distance between said lines, means for counting the number of said time intervals falling within a predetermined range indicative of a genuine bill, said counting means being insensitive to time intervals falling outside said range, and acceptance means responsive to said counting means for indicating the acceptability of said bill.

13. Apparatus for validating a bill having an area with spaced parallel lines, said apparatus including means for scanning said area to produce a train of outputs corresponding to said lines, said outputs being spaced by time intervals corresponding to the distance between said lines, a crystal oscillator, means operating synchronously with said oscillator for measuring the durations of said time intervals, comparison means responsive to a measured duration falling within a predetermined range indicative of a genuine bill for providing an output, said means being insensitive to measured durations falling outside said range, means for counting the outputs of said comparison means, and acceptance means responsive to said counting means for indicating the acceptability of said bill.

14. Apparatus for validating a bill having an area with spaced parallel lines, said apparatus including means for scanning said area to produce a train of outputs corresponding to said lines, said outputs being spaced by time intervals corresponding to the distance between said lines, a crystal oscillator, means operating synchronously with said oscillator for counting the number of said time intervals falling within a predetermined range indicative of a genuine bill, said counting means being insensitive to time intervals falling outside said range, and acceptance means responsive to said counting means for indicating the acceptability of said bill.

15. Apparatus for validating a bill having an area normally containing a certain number of spaced parallel lines, said apparatus including means for scanning said area to produce a train of outputs corresponding to said lines, said outputs being spaced by time intervals corresponding to the distance between said lines, means for counting the number of said time intervals falling within a predetermined range indicative of a genuine bill, said counting means being insensitive to time intervals falling outside said range, and acceptance means responsive to said counting means for indicating the acceptability of said bill, said acceptance means indicating that said bill is not acceptable if less than a predetermined number of said time intervals less than the number of spaces between said certain number of lines fall within said range.

16. Apparatus as in claim 15 in which said predetermined number of time intervals is approximately 80% of the number of spaces between said lines.

17. Apparatus for validating a bill having an area with spaced parallel lines, said apparatus including means for scanning said area to produce a train of outputs corresponding to said lines, said outputs being spaced by time intervals corresponding to the distance between said lines, means for counting the number of said time intervals falling within a predetermined range indicative of a genuine bill, said counting means being insensitive to time intervals falling outside said range, and acceptance means responsive to said counting means for indicating the acceptability of said bill, said acceptance means indicating that said bill is not acceptable if less than a predetermined number of said time intervals fall within said range.

18. Apparatus for validating a bill having an area with spaced parallel lines, said apparatus including means for scanning said area to produce a train of outputs corresponding to said lines, said outputs being spaced by time intervals corresponding to the distance between said lines, means for counting the number of said time intervals falling within a predetermined range indicative of a genuine bill, said counting means being insensitive to time intervals falling outside said range, and acceptance means responsive to said counting means for indicating the acceptability of said bill.

* * * * *